US011410222B1

(12) United States Patent
Mozol-Ciocirlan et al.

(10) Patent No.: US 11,410,222 B1
(45) Date of Patent: Aug. 9, 2022

(54) DEVICE AND METHOD FOR GENERATING USER INTERFACE FOR MANAGEMENT OF SELLER PARTNER SERVICES

(71) Applicant: AMAZON TECHNOLOGIES, INC., Seattle, WA (US)

(72) Inventors: Natalia Mozol-Ciocirlan, Seattle, WA (US); Satyaramakrishna Kuladeep Achanta, Seattle, WA (US); Hamdan Kabir, Seattle, WA (US); Victoria Khemani, Seattle, WA (US); Saurangshu Pandey, Redmond, WA (US); Mehdi Sheikholeslami, Seattle, WA (US); Samson Wong, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 220 days.

(21) Appl. No.: 16/175,063

(22) Filed: Oct. 30, 2018

Related U.S. Application Data

(60) Provisional application No. 62/711,357, filed on Jul. 27, 2018.

(51) Int. Cl.
*G06Q 30/00* (2012.01)
*G06Q 30/06* (2012.01)
*G06F 9/451* (2018.01)
*G06F 3/0483* (2013.01)
*G06F 3/0482* (2013.01)

(52) U.S. Cl.
CPC ....... *G06Q 30/0641* (2013.01); *G06F 3/0482* (2013.01); *G06F 3/0483* (2013.01); *G06F 9/453* (2018.02); *G06Q 30/0609* (2013.01)

(58) Field of Classification Search
CPC .......... G06Q 30/0643; G06Q 30/0641; G06Q 30/0609; G06F 9/453; G06F 3/0483; G06F 3/0482
USPC ............................... 705/26.1–27.2
See application file for complete search history.

(56) References Cited

U.S. PATENT DOCUMENTS

2003/0040976 A1\* 2/2003 Adler ................. G06Q 30/02
705/27.1

OTHER PUBLICATIONS

Youwei Wang, Shan Wang, Yulin Fang, Patrick Y.K. Chau, "Store survival in online marketplace: An empirical investigation," Decision Support Systems, vol. 56, pp. 482-493, ISSN 0167-9236, https://doi.org/10.1016/j.dss.2012.11.005. (Year: 2013).\*

\* cited by examiner

*Primary Examiner* — Anand Loharikar
(74) *Attorney, Agent, or Firm* — Lindauer Law, PLLC

(57) ABSTRACT

Conventional user interfaces for large commercial ecosystems typically require a seller partner to scroll around and switch views many times to find the right operational service or data. A simplified user interface that includes limited information about those operational services enables the seller partner to more quickly and efficiently learn about, configure, and use those operational services which are available to them. The limited information may include eligibility information, seller partner-specific information associated with the operational service, and information about the operational service, allowing rapid navigation and decision making. Once enrolled in an operational service, the simplified user interface facilitates administration of the operational service.

20 Claims, 20 Drawing Sheets

DEVICE AND METHOD FOR GENERATING USER INTERFACE FOR MANAGEMENT OF SELLER PARTNER SERVICES

PRIORITY

This application claims priority to U.S. Provisional Patent Application Ser. No. 62/711,357 filed on Jul. 27, 2018, entitled "Simplified User Interface for Management of Merchant Seller Partner Services." The entirety of this previously filed application is hereby incorporated by reference.

BACKGROUND

Commercial ecosystems provide an infrastructure for seller partners to operate. These commercial ecosystems may facilitate interactions between customers and seller partners. Traditionally, the interactions between a seller partner and the commercial ecosystem have involved dealing with numerous complex user interfaces, making it difficult for the seller partners to determine, administer, or otherwise interact with the operational services available to them.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
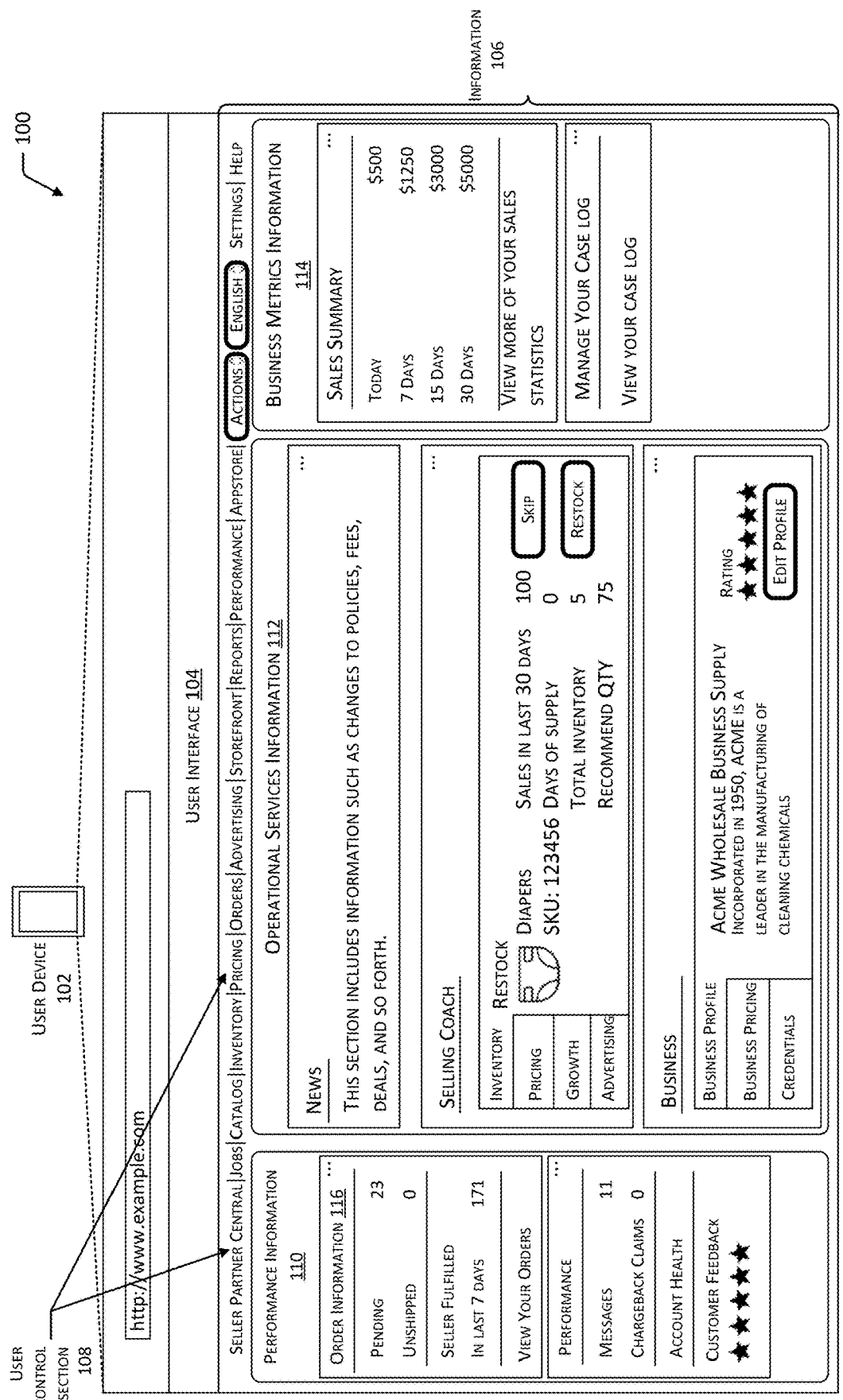
FIG. 1 is an example of a user interface that enables seller partners to manage operational services, according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A seller partner may be an individual operating a sole proprietorship or a company with thousands of employees that provide goods or services to customers. Increasingly seller partners are operating as part of larger commercial ecosystems that provide a variety of different operational services. Operational services may comprise business programs or services including, but not limited to, fulfillment services, shipping services, tax compliance services, product return services, digital media distribution services, inventory management services, and so forth. For example, a company may provide a store which facilitates interactions between customers and seller partners. The store may include an online presence, such as a website, that customers are able to use to search for and acquire goods or services. The store may comprise a collection of network-accessible services executed on computer hardware that provide multiple channels (e.g., mobile app., voice-based search, web access, physical presence, etc.) through which customers (using a client computing device) may access various catalogs stored in databases to find various products and services available to purchase, lease, etc. sometimes in the form of detail pages.

Traditionally the interaction between a seller partner and a store has involved dealing with numerous, and in many instances complex, user interfaces. Seller partners have encountered difficulties in determining what operational services are available, eligibility of those services, details about those services, enrolling with those services, and reporting and analysis of the services on an ongoing basis.

In addition, user devices with small display screens tend to require that data and functionality be divided into many views. For example, the limited display size of a mobile device has conventionally meant that several hierarchies of functions have to be offered to the seller partner or customer. The seller partner or customer may first locate the correct top-level function and then, within that function, progressively drill down (sometimes through 3 or more layers) to complete the required task. Hence, with conventional user interfaces, a user may need to scroll around, and switch views many times to find the right data or functionality.

Described in this disclosure is a system that provides a scalable self-service framework that allows for a significantly simplified user interface to facilitate management by a seller partner of operational services available from a store. The system allows for the store to provide operational services quickly and easily to seller partners when the operational services become available. The system also provides a significantly simplified user interface within which seller partners are able to administer operational services.

As used in this disclosure, items may include one or more of products, services, digital content, and so forth. Items may be represented by a stock keeping unit ("SKU"). For example, the SKU may comprise an alphanumeric string that represents a particular make and model of a product, or a particular service offering.

The system may precompute information associated with the seller partner or items associated with the seller partner. The precomputed information may include information about the eligibility of the seller partner to utilize a particular operational service, or the eligibility of a particular item associated with the seller partner to be associated with or otherwise utilize a particular operational service.

Each operational service may have one or more rules or conditions associated with eligibility. For example, an operational service may be limited to seller partners operating in particular geographic regions, with particular taxable entity categorizations, having particular types of distribution facilities, handling certain types of items, minimum time in business, minimum threshold number of orders fulfilled, minimum customer evaluation scores, and so forth.

The system may provide a user interface with one or more summary elements. The summary elements may comprise one or more of hypertext markup language (HTML), scripts, executable code, graphics, video, audio, and so forth. For example, a summary element may comprise a limited list of information that may include various user data entry fields, user controls, widgets, and so forth. Summary elements may be provided for one or more of the following categories of use: discovery, information or understanding, enrollment, management, and so forth.

The discovery summary element involves a user interface that provides information about particular operational services to the seller partner. For example, the discovery summary element may provide information about those operational services that the seller partner is either currently eligible for, may be eligible for at some point in the future, or that are offered by the store, but the seller partner is ineligible for. In some implementations, the discovery summary element may use the precomputed data about eligibility to determine which operational services are to be displayed.

The information, or understanding, summary element provides a user interface with additional details about the operational services that are presented in the discovery summary element. For example, the information summary element may provide information such as fees, program details, information about the number of items available to utilize the particular operational service, and so forth.

The enrollment summary element provides a user interface with controls allowing the seller partner to enroll in using an operational service, disenroll from using an operational service, and so forth. The enrollment summary element may present information about metrics associated with the program. These metrics may be based on information specific to the seller partner, such as the seller partner's historical activity, projected activity, and so forth. The enrollment summary element may provide controls that allow the seller partner to selectively enroll particular items or groups of items in the particular operational service.

The management summary element provides a user interface with information about operational services, items using those operational services, and may also present controls allowing the seller partner to add, remove, or modify parameters about the operational services which pertain to that item. For example, the management summary element may provide information such as number of units sold, number of subscriptions to purchase items on a recurring schedule, total sales, number of units shipped, and so forth. The management summary element may, in some implementations, provide at least some of the functions of the enrollment summary element to give the seller partner the ability to enroll or disenroll particular items.

By using the techniques and systems described above, a significantly simplified user interface to facilitate management by a seller partner of operational services available from a store is provided. The simplified user interface presents limited information about the operational service, allowing for rapid navigation and decision making without necessarily having to select a particular operational service. This saves the seller partner from having to access each of the operational services to learn about what each of them provide.

As one skilled in the art will appreciate in light of this disclosure, certain embodiments may be capable of achieving certain advantages, including some or all of the following: (1) improving the ability of a computer to display information and interact with the seller partner by simplifying the user interface by presenting a limited amount of information about an operational service, (2), reducing network latencies by having a limited amount of information being presented about an operational service, rather than having all of the information being presented at one time for the operational services, (3) enabling user devices to run more efficiently and faster by having to process less data to render a user interface displaying the limited amount of information about the operational service, and so forth.

A large commercial ecosystem may offer hundreds of operational services and support millions of items. The task of navigating and locating available operational services of interest can be burdensome and time consuming for seller partners, especially when the seller partners do not know the names or generic descriptors of the desired operational services. Typically, the seller partner can locate items by navigating a browse structure, commonly called a "browse tree," in which the operational services are arranged by category and subcategory. However, the browse tree includes several levels of categories, requiring the seller partner to navigate through several levels of browse nodes or category pages to arrive at the subcategory of interest. Further, in some cases, the operational services of interest are not accurately or intuitively categorized, requiring the seller partner to perform additional navigation or keyword searching. Thus, the seller partner frequently has to perform numerous navigational steps to arrive at the page of interest.

Another technological advance of the present disclosure is to allow seller partners to identify services of interest with fewer clicks, scrolls, and/or page navigations that would otherwise be required to assess operational services for suitability. For example, in the embodiments described herein, when the seller partner is presented with the simplified user interfaces described herein, the user interfaces include a link to the page for the corresponding operational service, allowing the seller partner to navigate directly to this page. Each link thus serves as a programmatically selected navigational shortcut to the operational service's page or description, allowing the seller partner to bypass the navigational structure of the browse tree. Beneficially, programmatically identifying operational services of interest and presenting the seller partner with navigational shortcuts to these operational services can improve the speed of the seller partner's navigation through the browse tree, rather than requiring the seller partner to page through multiple other pages to locate the desired operational services via the browse tree or via searching. This can be particularly true for computing devices with small screens, where fewer items can be displayed to the user at a time and thus navigation of larger volumes of items is more difficult.

FIG. 1 is an example 100 of a user interface that enables seller partners to manage operational services, according to one implementation. A user device 102 may include a user interface 104. The user device 102 may be a television, tablet computer, personal computer, electronic book reader, gaming console, set-top box, media player, in-vehicle entertainment system, smartphone, server, device control system, a voice activated device, and so forth. The user device 102 may utilize automated speech recognition or other techniques to receive and analyze audible user inputs.

The user interface 104 may be configured to present information 106. The information 106 may include a user control section 108 that includes one or more user controls, performance information 110, operational services information 112, business metrics information 114, and so forth. For example, the user control section 108 may enable a seller partner to select and view such information and operational services as: seller partner central home portal page, jobs, catalog, inventory pricing, orders, advertising, storefront, reports, performance, application store, and so forth.

The performance information 110 may include such information as order information 116, sales information, other information, and so forth. The order information 116 may include such information as the number of pending orders, premium unshipped orders, unshipped orders, and so forth. In other implementations, the order information 116 may include seller partner order fulfillment information. For example, the seller partner order fulfillment information may indicate the number of orders fulfilled by the seller partner in the last day, seven (7) days, last month, three (3) months, and so forth. In yet another implementation, the order information 116 may include store order fulfillment information. For example, the store order fulfillment information may indicate the number of orders fulfilled by the store in the last day, seven (7) days, and so forth.

The operational services information 112 may include such information as news about the seller partner. For example, the news may include information about order cancellations, incomplete shipments, incorrect shipments, upcoming discount services for items, and so forth. The operational services information 112 may also include information about the benefits the operational services may provide to the seller partner. For example, the information may include a virtual coach that indicates inventory status and whether an item is about to be out of stock or is out of stock. In this example, the user interface 104 may present one or more user controls that enable the seller partner to perform an action on a particular item, such as reordering the item. In another example, the information may further include a virtual coach that provides information with regards to pricing of items, growth strategies, advertising, fulfillment, and so forth. The operational services information 112 may also include information about the seller partner. For example, the information may include a business profile of the seller partner, business pricing, credentials, item documents, and so forth.

The business metrics information 114 may include such information as payment summary, sales summary, and so forth. For example, the payment summary may indicate the number of invoiced orders, outstanding payments, most recent payments, and so forth. In another example, the sales summary may indicate ordered item sales and the number of units associated with the ordered item sales. For example, the ordered item sales number may indicate $500 worth of sales, which corresponds to 25 units being purchased. In other implementations, the business metrics information 114 may include inventory planning.

In other implementations, the information 106 may include customer feedback information associated with the seller partner, one or more controls that enable the seller partner to change the language, such as from English to Spanish, settings control, and so forth.

As illustrated in FIG. 1 the interaction between a seller partner and a store using the displayed user interface 104 is relatively complex. The seller partners may encounter difficulties in determining what operational services are available, eligibility of those services, details about those services, in enrolling with those services, and reporting and analysis of the services on an ongoing basis. These difficulties may be burdensome and time consuming for the seller partners, especially when the seller partners do not know the names or generic descriptors of the operational services. Typically, the seller partner may locate items by navigating a browse structure, commonly called a "browse tree," in which the operational services are arranged by category and subcategory. However, the browse tree includes several levels of categories, requiring the seller partner to navigate through several levels of browse nodes or category pages to arrive at the subcategory of interest. Further, in some cases, the operational services may not be accurately or intuitively categorized, requiring the seller partner to perform additional navigation or keyword searching. Thus, the seller partner frequently has to perform numerous navigational steps to arrive at the page of interest.

In addition, the user device 102 may have a small display screen, which tends to require data and functionality to be divided into many views. For example, the limited display size of the user device 102 may cause the user interface 104 to present top-level functions and then, within that function, progressively drill down (sometimes through 3 or more layers) to complete the required task.

As will be described in further details below, FIGS. 2-20 describe a system that provides a scalable self-service framework that allows for a significantly simplified user interface to facilitate management by a seller partner of operational services available from a store. The system allows for the store to provide operational services quickly and easily to seller partners when the operational services become available. The system also provides a significantly simplified user interface within which seller partners are able to administer operational services.

Figure 2:
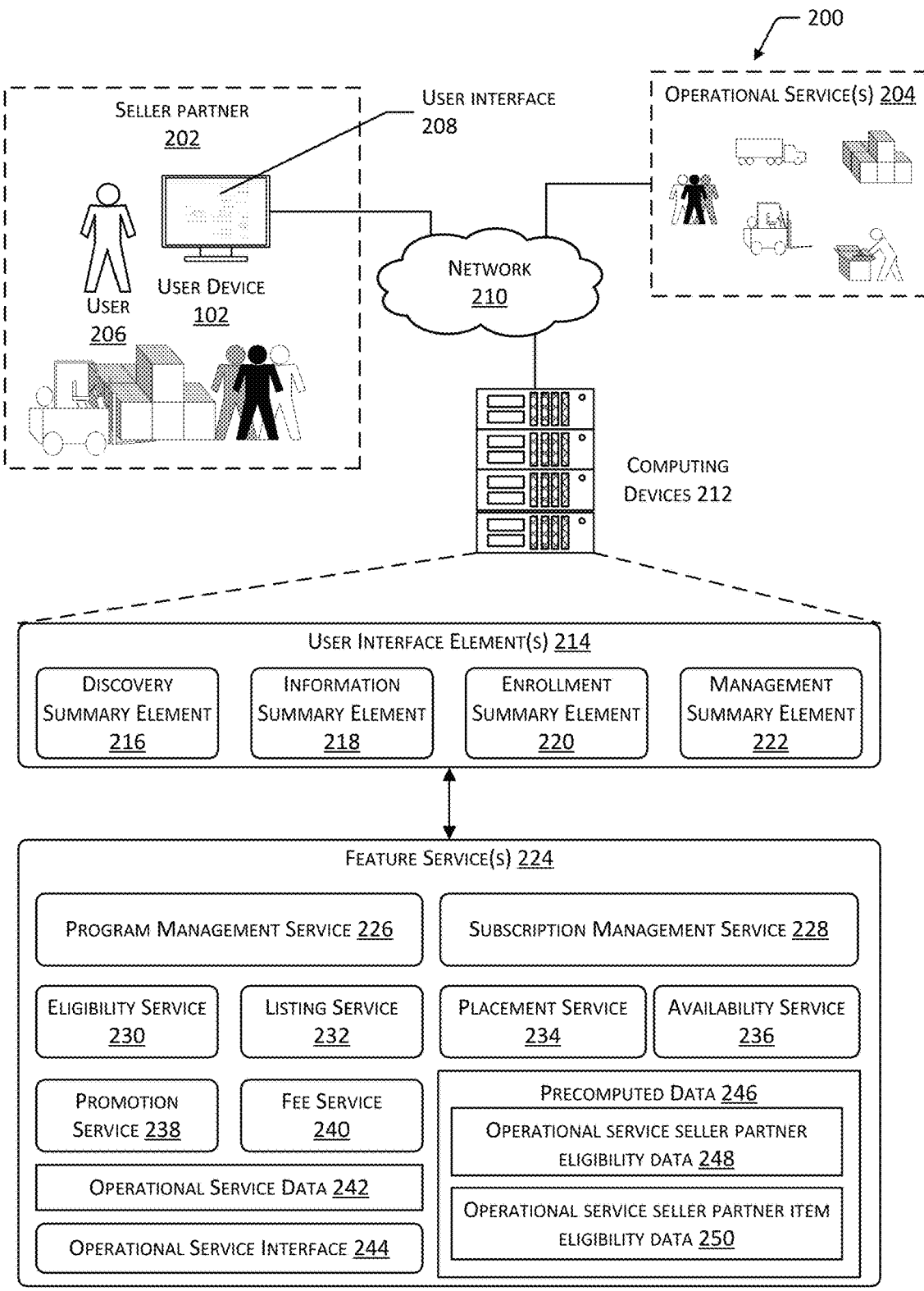
FIG. 2 depicts a schematic of a system for providing a set of computing devices with a user interface that enables seller partners to manage operational services, according to one implementation.

FIG. 2 depicts a schematic of a system 200 for providing a set of computing devices with a user interface that enables seller partners to manage operational services, according to one implementation. The task of navigating a large electronic database to locate information and services of interest can be burdensome and time consuming for seller partners 202, especially if the seller partners 202 do not know the names or generic descriptors of the items. The seller partners 202 frequently have to perform numerous navigational steps to arrive at the page of interest.

The algorithms and user interfaces 208 of the type disclosed herein significantly reduce this problem, allowing the seller partners 202 to locate items/services of interest with fewer steps. For example, in the embodiments described herein, when the seller partner 202 is presented with one or more discovery summery elements 216, each element includes, or is in the form of, a link to the relevant page for the corresponding item, allowing the seller partner 202 to navigate directly to this page. Each recommendation thus serves as a programmatically selected navigational shortcut to the item's page or description, allowing the seller partner 202 to bypass the navigational structure of a browse tree. Beneficially, programmatically identifying items of interest and presenting the seller partner 202 with navigational shortcuts to these items can improve the speed of the seller partner's 202 navigation through the database, rather than requiring the seller partner 202 to page through multiple other pages to locate the items via the browse tree or via searching. This can be particularly true for computing devices with small screens (or voice-based services), where fewer items can be displayed or presented to the seller partner 202 at a time and thus navigation of larger volumes of items is more difficult.

The seller partner 202 may be an individual operating a sole proprietorship, a company with thousands of employees that provide goods or services to customers, and so forth. The seller partner 202 may utilize or participate in a commercial ecosystem that provides one or more operational services 204. For example, the commercial ecosystem may comprise a digital store provided by an ecommerce company. The digital store may provide an online presence for the seller partner. For example, the online presence may be a website that enables customers to purchase and view one or more items offered by the seller partner 202.

Operational services 204 may comprise business programs or services including, but are not limited to, fulfillment services, shipping services, tax compliance services, product return services, digital media distribution services, inventory management services, and so forth.

The seller partner 202 may have a user 206, such as an owner, operations manager, warehouse manager, sales and marketing director, and so forth that is tasked with administering the operational services 204. The user 206 may utilize the user device 102 such as a laptop, tablet, smart phone, network enabled audio device, virtual reality headset, and so forth to present a user interface 208. The user interface 208 may present information that is received via a network 210 from one or more computing devices 212. For example, the one or more computing devices 212 may comprise servers. The computing devices 212 may provide one or more user interface elements 214, that may be processed by the user device 102 to present the user interface 208 to the user 206.

In another implementation, instead of or in addition to the user interface 208, the computing devices 212 may provide an application programming interface ("API") which facilitates interactions between devices. The API may facilitate interactions between an application executing on the user device 102 and an application executing on the one or more computing devices 212. For example, the application executing on the user device 102 may send a request to the computing devices 212. The API may receive the request and instruct the computing devices 212 that the user device 102 is accessing the store. The computing device 212 may access seller partner data associated with the seller partner 202 to determine the one or more operational services 204 that the seller partner 202 is currently enrolled in, eligible for, ineligible for, and so forth. The computing devices 212 may also determine a limited amount of information associated with individual ones of the one or more operational services 204, as described in more detail below. The computing device 212 may generate a response that includes information about one or more summary elements recommending the one or more operational services 204 that the seller partner 202 is eligible for, ineligible for, currently enrolled in, and so forth. The information may also include a first data structure comprising information indicative of the one or more operational services 204 that the seller partner is eligible for. For example, the information may indicate that the seller partner 202 is eligible for the subscribe and save operational service, the wardrobe operational service, and so forth. The information may include a second data structure comprising information indicative of information about the one or more operational services 204. For example, the information may describe the particular operational service 204, the benefits the seller partner 202 would receive, and so forth. The API of the computing device 212 may send the generated response to the user device 102. The user device 102 upon receipt of the response may generate the user interface 208 to display the information, as described in more detail in FIGS. 3-18.

In another implementation, the information may include a third data structure comprising information indicative of the one or more operational services 204 that the seller partner is ineligible for. For example, the information may indicate that the seller partner 202 is ineligible for the sample operational service. The information may also include a fourth data structure comprising information indicative of criteria to accomplish eligibility for the one or more operational services 204. For example, the information may indicate that when the seller partner 202 enrolls twenty (20) items of a particular size that the seller partner 202 would be eligible for the sample operational service. The API of the computing device 212 may send the generated response to the user device 102. The user device 102 upon receipt of the response may generate the user interface 208 to display the information, as described in more detail in FIGS. 3-18.

In other implementations, the information may include additional data structures comprising information indicative of one or more recommendations of one or more items from the list of items that are eligible to be enrolled in the selected operational service 204, information indicative of one or more costs associated with the selected operational service 204, information indicative of terms and conditions associated with the selected operational service 204, and so forth. The user device, 102 upon receipt of the response, may generate the user interface 208 to display the information, as described in more detail in FIGS. 3-18.

In yet another implementation, the API may receive a request and instruct the computing device 212 that the user device 102 has selected to view a particular operational service 204. For example, the particular operational service 204 may be the subscribe and save operational service. The computing device 212 may generate a response that includes a data structure comprising information indicative of a list of items associated with the selected one or more operational services 204. For example, the information may indicate a list of baby items for the subscribe and save operational service. The response may include a second data structure comprising information indicative of an operational service element that presents information for individual items included in the list of items. The user device 102, upon receipt of the response, may generate the user interface 208 to display the information, as described in more detail in FIGS. 3-18.

The user interface elements 214 ("elements") may comprise one or more of hypertext markup language (HTML), scripts, executable code, graphics, video, audio, and so forth. For example, a user interface element 214 may comprise various user data entry fields, user controls, widgets, and so forth. The user interface element 214 may be provided for one or more of the following categories of use: discovery summary elements 216, information summary elements 218, enrollment summary elements 220, or management summary elements 222.

The discovery summary element 216 involves a user interface 208 that provides a limited list of information about particular operational services 204 to the seller partner. For example, the discovery summary element 216 may provide information about those operational services 204 that the seller partner 202 is either currently eligible for, may be eligible for at some point in the future, or that are offered by the store, but the seller partner is ineligible for. In some implementations, the discovery summary element 216 may use the precomputed data (described below) about eligibility to determine which operational services 204 are to be displayed.

The discovery summary element 216 provides information about eligibility of the seller partner 202 and items that may be defined across one or more of the operational services 204. The discovery summary element 216 may provide recommendations of operational services 204 based on certain product criteria, goals of the seller partner 202, forecasted success, and so forth. Individual discovery summary elements 216 may be laid out as recommended, eligible, ineligible for particular operational services 204, and so forth. The discovery summary element 216 may provide a single interface in which all available operational services 204 may be accessed.

The discovery summary element 216 may be generated based on determining seller partner data associated with the seller partner 202. The seller partner data may include data indicative of current enrollment by the seller partner 202 to use the one or more operational services 204. For example, the data may indicate that the seller partner 202 is currently enrolled in a sample operational service. The computing device 212 may generate the user interface 208 to include the discovery summery element 216 corresponding to the sample operational service which may indicate that the seller partner 202 is currently enrolled in that operational service 204. In other implementations, the data may be indicative of eligibility of the seller partner 202 to enroll in one or more operational services 204. For example, the data may indicate that the seller partner 202 is eligible to enroll in a subscribe and save operational service. The computing device 212 may generate the user interface 208 to include the discovery summary element 216 corresponding to the subscribe and save operational service. In yet another implementation, the data may indicate one or more attributes of previous activity associated with the seller partner 202. For example, the data may indicate that the seller partner 202 has shipped one or more items under a particular cost, such as $10.00. The computing device 212 may determine, based on the data, that the seller partner 202 may be eligible for a small and light operational service. The computing device 204 may generate the user interface 208 to include the discovery summery element 216 corresponding to the small and light operational service.

The information summary element 218 may provide a limited list of additional information about the operational services 204 that may be presented in the discovery summary element 216. For example, the information summary element 218 may provide information such as fees, program details, information about the number of items available to utilize the particular operational service 204, and so forth. The information summary element 218 may surface to the seller partner 202 item eligibility information along with the number of eligible items per operational service 204. The information summary element 218, as well as other elements, may utilize reusable section templates that can be applied to all operational services 204. In another example, the user interface 208 may present the information summary element 218 corresponding to the sample operational service. The user interface 208 may present the information summary element 218 associated with the sample operational service, which may include a limited list of information such as a description indicating that the samples operational service distributes your samples to premium customers, acquires new customers and reviews, and measures sampling return on investment (ROI).

The enrollment summary element 220 may provide the user interface 208 with one or more user controls enabling the seller partner 202 to enroll in using an operational service 204, disenroll from using an operational service 204, and so forth. The enrollment summary element 220 may present information about metrics associated with the operational service 204. These metrics may be based on information specific to the seller partner 202, such as the seller partner's historical activity, projected activity, and so forth. The enrollment summary element 220 may provide controls that enable the seller partner 202 to selectively enroll particular items or groups of items in the particular operational service 204. For example, the seller partner 202 may be enrolled or seek to be enrolled in the subscribe and save operational service. The enrollment summary element 220 may enable the seller partner 202 to enroll one or more baby items to the store making the seller partner 202 eligible to use the subscribe and save operational service for baby items.

The enrollment summary element 220 may aid the seller partner 202 in making decisions about item enrollment by providing operational service 204 specific success metrics. The data presented may differ based on the operational service 204. The enrollment summary element 220 may provide different paths to enrollment. For example, selection for enrollment may be made on a per-item basis, bulk selection based on criteria, or via a bulk upload. In some implementations, the seller partner 202 may hide recommended items in the enrollment interface. For example, if items are uploaded via bulk upload, the uploaded items are recognized as enrolled and no longer recommended to the seller partner 202 via individual item enrollment.

The management summary element 222 may provide the user interface 208 with information about the operational services 204, items using those operational services 204, and may also present one or more controls enabling the seller partner 202 to add, remove, or modify parameters about the operational services 204 which pertain to that item. For example, the management summary element 222 may provide information such as number of units sold, number of subscriptions to purchase items on a recurring schedule, total sales, number of units shipped, and so forth. The management summary element 222 may, in some implementations, provide at least some of the functions of the enrollment summary element 220 to give the seller partner 202 the ability to enroll or disenroll particular items. For example, the management summary element 222 may enable the seller partner 202 to select for enrollment one or more items on a per-item basis, bulk selection based on criteria, or via a bulk upload.

The management summary element 222 may aid the seller partner 202 in making continuing enrollment in the one or more operational services 204 by providing one or more performance metrics. The one or more performance metrics may include a first performance element that presents a purchase rate. The purchase rate may be for one or more items associated with the one or more operational services 204 of the seller partner 202. The purchase rate may indicate how often a particular item is purchased. For example, the purchase rate may indicate that diapers tend to be purchased by a particular user every thirty (30) days. The one or more performance metrics may include a second performance element that presents a cancellation rate of user subscription to one or more operational services 204 associated with the seller partner 202. For example, the second performance element may indicate a cancellation rate of sixty (60) days after a customer subscribes they cancel their subscription. The one or more performance metrics may include a third performance element that presents a return rate for one or more items associated with the one or more operational services 204 of the seller partner 202. For example, the third performance element may indicate that the customer may have a return rate of 50% for a particular item.

The management summary element 222 may provide a single destination in which items enrolled in a particular operational service 204 are managed. Decision making by the seller partner 202 may be enhanced by surfacing alerts such as low inventory, inventory less than forecasted, out of stock, price violation, at risk of long-term storage fees (LTSF), at risk of auto-removal, and so forth. The alerts may be associated with a default action recommendation. For example, low inventory alerts may create a default action to send/replenish inventory. The seller partner 202 can add more items using the management summary element 222. The management summary element 222 may reuse one or more of the templates used in the enrollment summary element 220 to enroll items into an operational service 204 for the first time. The seller partner 202 may be given an indication of the number of eligible items to enroll. A control for one-step unenrollment from an operational service 204 may be implemented with a confirmation modal controller.

If during item or operational service 204 unenrollment, certain items need to be enrolled in an operational service 204 for a certain time as indicated in terms and conditions, then countdown messaging along with visualizations may be provided by the management summary element 222. For example, the terms and conditions may indicate that items listed in the subscribe and save operational service may need to be listed until the subsequent delivery of items occurs. The management summary element 222 may provide a countdown messaging indicating that thirty (30) days are remaining before the item will be removed.

The user interface elements 214 may acquire data from one or more feature services 224. The feature services 224 may include a program management service 226, a subscription management service 228, and so forth. The program management service 226 may manage the data interchange between the user interface elements 214 and one or more feature services 224. The subscription management service 228 may be used to control which feature services 224 the user interface elements 214 are permitted to exchange information with via the program management service 226.

In other implementations, the feature services 224 may provide various functionality of particular operational services 204 or portions thereof. An eligibility service 230 may be used to determine if a particular seller partner 202, item, or combination thereof, is eligible for a particular operational service 204. A listing service 232 may provide information such as those operational services 204 that are being presented as available for use. A placement service 234 may provide information as to how one or more user interface elements 214 may be arranged in the user interface 208, such as by ranking in order of relevance to the seller partner 202. An availability service 236 may provide information about the current status of a particular operational service 204, performance of the operational service 204, and so forth.

A promotion service 238 may be configured to implement a promotion strategy in which one or more operational services 204 or features thereof are presented to one or more seller partners 202 at various points within the user interface 208. A fee service 240 may provide information about fees that are associated with an operational service 204. In some implementations, the fee service 240 may be configured to calculate fees assessed to the seller partner 202 for use of the operational services 204, as described in more detail below.

The feature services 224 may exchange operational service data 242 with one or more computing devices 212 associated with the operational services 204. An operational service interface 244 may coordinate the exchange of information with these operational services 204.

The system 200 may generate precomputed data 246 for use during operation. The precomputed data 246 may include operational service seller partner eligibility data 248, operational service seller partner item eligibility data 250, and so forth. For example, the eligibly service 230 may generate the precomputed data 246. The operational service seller partner eligibility data 248 may comprise information indicative of whether particular seller partners 202 are eligible for particular operational services 204. The operational service seller partner item eligibility data 250 may comprise information indicative of whether particular items offered by a particular seller partner 202 are eligible for particular operational services 204. The precomputed data 246 may be updated dynamically, responsive to an event, on demand, or according to a specified schedule.

By using the system 200 described herein, the seller partner 202 is able to utilize a significantly simplified user interface 208 to discover, learn about, enroll in, and manage various operational services 204, as compared to FIG. 1. Information about operational services 204 is readily accessible, as is pertinent eligibility information, allowing for faster and more reliable decision making and reducing the time and effort needed for the seller partner 202 to acquire information needed to make a choice and implement that choice with regard to operational services 204. The user interface 208 provides significant enhancements with regard to seller partners 202 with a wide variety of items that they are managing. As a result, the seller partner 202 is able to more efficiently operate and is better able to utilize the operational services 204.

In other implementations, other systems, modules, elements, and so forth may be used to provide the user interface 208. While the user interface 208 is described as being visual, in other implementations one or more portions may be presented in other ways. For example, the user interface 208 may be presented to a user audibly using a text to speech system. Continuing the example, inputs to the user interface 208 may be provided using speech that is recognized by an automated speech recognition system.

Figure 3:
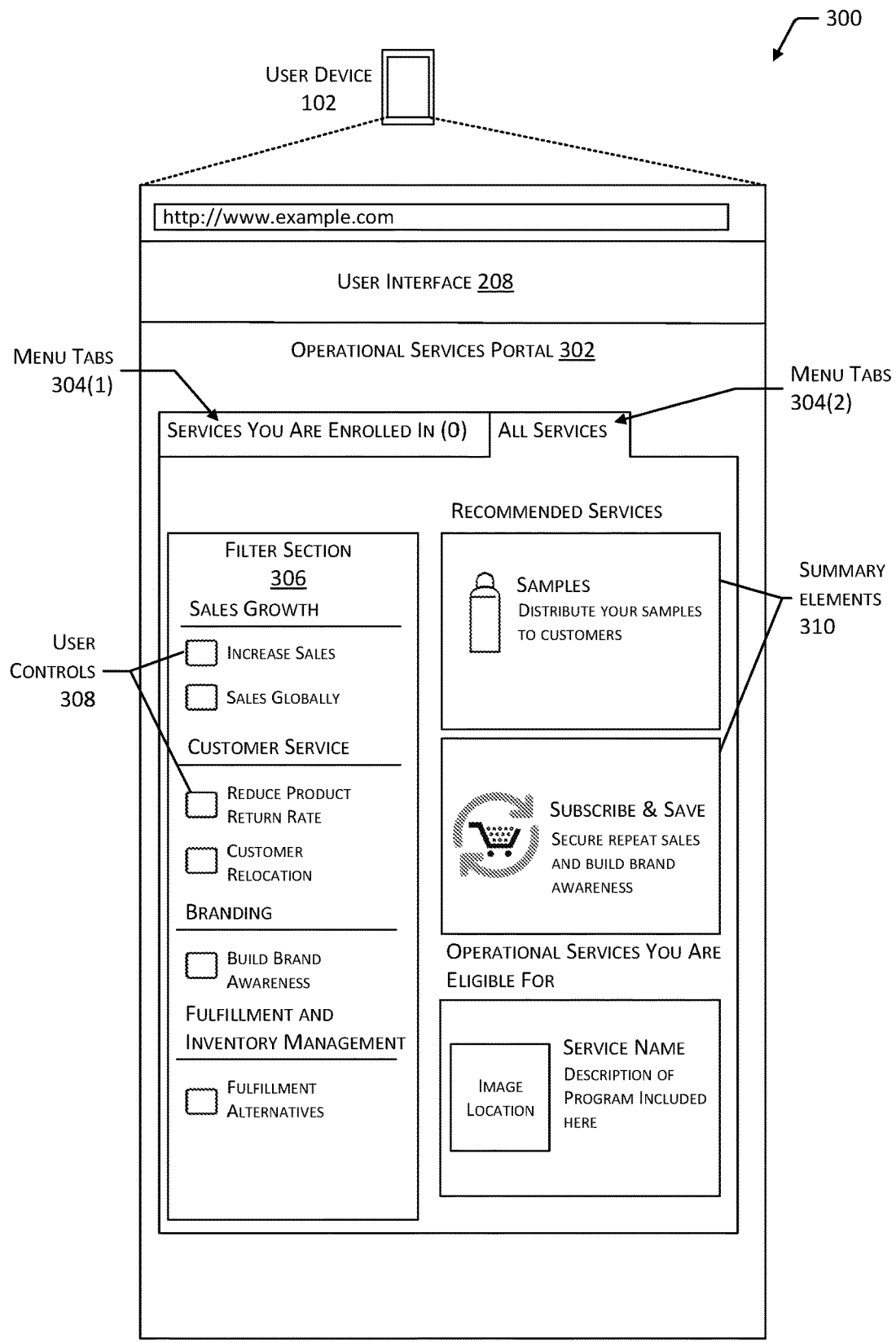
FIG. 3 is an example of a user interface that enables seller partners to view discovery summary elements for individual operational services, according to one implementation.

FIG. 3 is an example 300 of a user interface that enables seller partners to view discovery summary elements for individual operational services, according to one implementation. The example 300 may include the user device 102, as described above. The user device 102 may be configured to present the user interface 208. The user interface 208 may be configured to present an operational services portal 302. The operational services portal 302 may enable the seller partner 202 to view all the operational services 204 they are currently enrolled in, as well as see a list of the discovery summary elements 216. The significantly simplified user interface 208 enables the seller partner 202 to discover, learn about, enroll in, and manage various operational services 204 through the use of the operational services portal 302 including menu tabs 304.

The menu tabs 304 may include a menu tab 304(1) that is configured to include all the operational services 204 that the seller partner 202 is currently enrolled in. For example, the user device 102 may receive a user input selecting the menu tab 304(1). The operational services portal 302 may present the operational services 204 that the seller partner 202 is currently enrolled in. The menu tabs 304 may include a menu tab 304(2) that is configured to include all the operational services 204 that the seller partner 202 is enrolled in, eligible for, ineligible for, and so forth. The operational services 204 that the seller partner 202 is eligible for may be presented as a recommended service, as will be described in further detail below. The menu tabs 304 may be presented or located proximately towards a top edge of the operational services portal 302. In other implementations, the menu tabs 304 may be presented or located to a left edge, right edge, or bottom edge of the operational services portal 302.

In other implementations, the menu tab 304 may include additional menu tabs 304(3), 304(4), . . . , 304(D) (not shown). As used in this disclosure, letters in parenthesis such as "(D)" indicate an integer value. The individual additional menu tab 304(3) may be located adjacent to the menu tab 304(2), the individual additional menu tab 304(4) may be located adjacent to the menu tab 304(3), and so forth. The individual additional menu tabs 304(3), 304(4), . . . , 304(D) may be configured to include operational services 204 that the seller partner 202 is eligible for, ineligible for, upcoming operational services 204, operational services 204 that the seller partner 202 used to be enrolled in, operational services 204 that have been or soon will be discontinued, and so forth.

The operational services portal 302 may include a filter section 306. The filter section 306 may include a list of benefits or functions associated with individual operational services 204 that when selected filter the operational services 204 being presented to a list of operational services that correspond to the selected benefit or function. Proximate to each of the individual benefits or functions may be a user control 308. The user controls 308 may enable the user 206 to select a particular benefit or function by which to filter the list of operational services 204. For example, the filter section 306 may include the categories sales growth, customer service, branding, fulfillment and inventory management, and so forth. Each of the categories may include subcategories. For example, sales growth may include increase sales and sales globally, customer service may include reduce product return rate and customer relocation, branding may include build brand awareness, fulfillment and inventory management may include fulfillment alternatives, and so forth. Proximate to each category or subcategory may be the user control 308. The seller partner 202 may select the user control 308 proximate to increase sales and the computing devices 212 may filter the list of operational services 204 to cause the operational services portal 302 to present the operational services 204 that are associated with increasing sales. The filtered list of operational services 204 may include the operational services 204 that the seller partner 202 is currently enrolled in, eligible for, ineligible for, and so forth. In other implementations, the filtered list of operational services 204 may include a subset of all the operational services 204 associated with the selected user control 308.

The operational services portal 302 may include summary elements 310(1), 310(2), . . . , 310(D). The individual summary elements 310 may correspond to an operational service 204. For example, the individual summary elements 310 may correspond to a sample, operational service, subscribe and save operational service, wardrobe operational service, and so forth. Each of the summary elements 310 may include a limited amount of information. For example, the limited amount of information may include: the title of the operational service 204, an image associated with the operational service 204, a brief description of the operational service 204, and so forth. The limited amount of information included on the summary elements 310 is described in further detail in FIG. 4.

As illustrated in FIG. 3, the seller partner 202 may select the menu tab 304(2) associated with presenting all the operational services 204. The operational services portal 302 may present the recommended services, operational services 204 you are eligible for, operational services 204 you are ineligible for, operational services 204 the seller partner 202 is enrolled in, and so forth. The order of the presentation may be specified by the seller partner 202 in the account settings associated with the seller partner 202. For example, the seller partner 202 may have specified that recommended operational services 204 be presented first, followed by operational services 204 that the seller partner 202 is eligible for, and so forth. In other implementations, the order of the presentation may be a default presentation. For example, the default presentation may be to list the operational services 204 that the seller partner 202 is currently enrolled in, followed by the operational services 204 that the seller partner 202 is eligible for, and so forth.

In other implementations, the seller partners 202 that are enrolled in a limited number of operational services 204 or have recently joined the store may default to the menu tab 304(2) associated with presenting all the operational services 204 in which the discovery summary element 216, as well as the summary elements 310 associated with operational services 204 that the seller partner is and is not eligible for, may be presented.

In another implementation, the seller partners 202 that may be currently enrolled in operational services 204 may be defaulted to the menu tab 304(1) associated with the operational services 204 that the seller partner 202 is enrolled in.

In one implementation, the menu tabs 304, as described above, may be located or presented proximate to a top edge of the user interface 208. The filter section 306 may be located or presented proximate to the left edge of the user interface 208. The filter section 306 may be located below the menu tabs 304. The summary elements 310 may be located or presented proximate to a right edge of the user interface 208. In other implementations, the summary elements 310 may be located or presented to the left of the filter section 306 and below the menu tabs 304. In other implementations, the menu tabs 304, the filter section 306, and the summary elements 310 may be located towards the top edge, left edge, right edge, or bottom edge of the user interface 208.

By using the example 300 described herein, the seller partner 202 is able to utilize a significantly simplified user interface 208 to discover, learn about, enroll in, and manage the various operational services 204, as compared to FIG. 1. As illustrated in FIG. 3, information about the operational services 204 is readily accessible, as is pertinent recommendation and eligibility information, allowing for faster and more reliable decision making and reducing the time and effort needed for the seller partner 202 to acquire information needed to make a choice and implement that choice with regard to operational services 204. The user interface 208 and operational services portal 302 provides significant enhancements with regard to seller partners 202 with a wide variety of items that they are managing. As a result, the seller partner 202 is able to more efficiently operate and is better able to utilize the operational services 204. The example 300 also allows for the seller partner 202 to filter the operational services 204 based on a particular category or subcategory. The filtering enables the seller partner 202 to reduce the time and effort needed to locate and view particular operational services 204. For example, the seller partner 202 may be able to select a user control 308 associated with sales growth and have the operational services 204 that correspond to increasing sales growth be presented.

In another implementation, the user device 102 may include a display device configured to present the user interface 208. The user interface 208 may include the one or more summary elements 310 that can be reached directly from the menu tab 304. The one or more summary elements 310 present a limited list of information about one or more operational services 204 that the seller partner 202 is currently enrolled to use or is eligible for, as described above. The user device 102 may include at least one memory storing computer-executable instructions and at least one hardware processor in communication with the at least one memory. The at least one processor executes the computer-executable instructions to receive a request that is associated with the seller partner 202. For example, the user device 102 may receive a user input requesting to access the store. The user device 102 or the computing device 212 may determine seller partner data associated with the seller partner 202. The seller partner data may be first data. The seller partner data, as described above may include data indicative of current enrollment by the seller partner 202 to use the one or more operational services 204, data indicative of eligibility of the seller partner 202 to enroll in one or more available operational services 204, data indicative of one or more attributes of previous activity associated with the seller partner 202, and so forth. The user device 102 may determine whether the seller partner 202 or the one or more items are eligible for a particular operational service 204. For example, the user device 102 may determine based on customer reviews that the seller partner 202 is tardy with shipping orders. The user device 102 may determine that the seller partner 202 is ineligible to enroll in the operational service 204 as on time shipping is a requirement. The user device 102 or the computing device 212 may make this determination based on accessing data such as customer feedback ratings, item inventory, and so forth. The user device 102 or the computing device 212 based on the data, determines the operational services 204 that the seller partner 202 is eligible for. For example, the seller partner 202 may have a 5-star rating and an inventory number that exceeds an eligibility threshold. In this example, the seller partner 202 may be eligible. In another example, the seller partner 202 may have a 1-star rating and an inventory number that exceeds the eligibility threshold. In this example, the seller partner 202 may be ineligible based on the poor customer feedback rating. In yet another example, the seller partner 202 may have a 5-star rating and an inventory number that is below the eligibility threshold. In this example, the seller partner 202 may be ineligible based on the low inventory. The user device 102 may cause the user interface 208 to present information indicating that the seller partner 202 is ineligible based on the low inventory.

The user device 102 or the computing device 212 may generate, responsive to a request, the user interface 208 to include the one or more summary elements 310 configured to display on the user interface 208 one or more summaries of: the discovery summary element 216, the information summary element 218, the enrollment summary element 220, the management summary element 222, and so forth.

The elements 216, 218, 220, 222, and the summary elements 310 may include title information associated with the one or more available operational services 204. The title information is located proximately top center of an individual summary element 310, as described in more detail in FIG. 4. The elements 216, 218, 220, 222, and the summary elements 310 may also include an element image visually describing individual ones of the one or more available operational services 204. The element image may be located proximately left of the title information, as described in further detail in FIG. 4. The elements 216, 218, 220, 222, and the summary elements 310 may also include recommendation information indicating benefits the seller partner 202 may receive by enrolling in the individual ones of the one or more available operational services 204. The recommendation information may be located proximately below the eligibility status, as describe in more detail in FIG. 4. The elements 216, 218, 220, 222, and the summary elements 310 may also include fee information indicating the associated fees for enrolling in the individual ones of the one or more available operational services 204, as described in more detail below.

The enrollment summary element 220 may present a limited list of information that includes at least eligibility status indicating that the seller partner 202 is eligible for individual ones of the one or more available operational services 204. The eligibility status may be located proximately below the title information and proximately right of the title information, as described herein.

Figure 4:
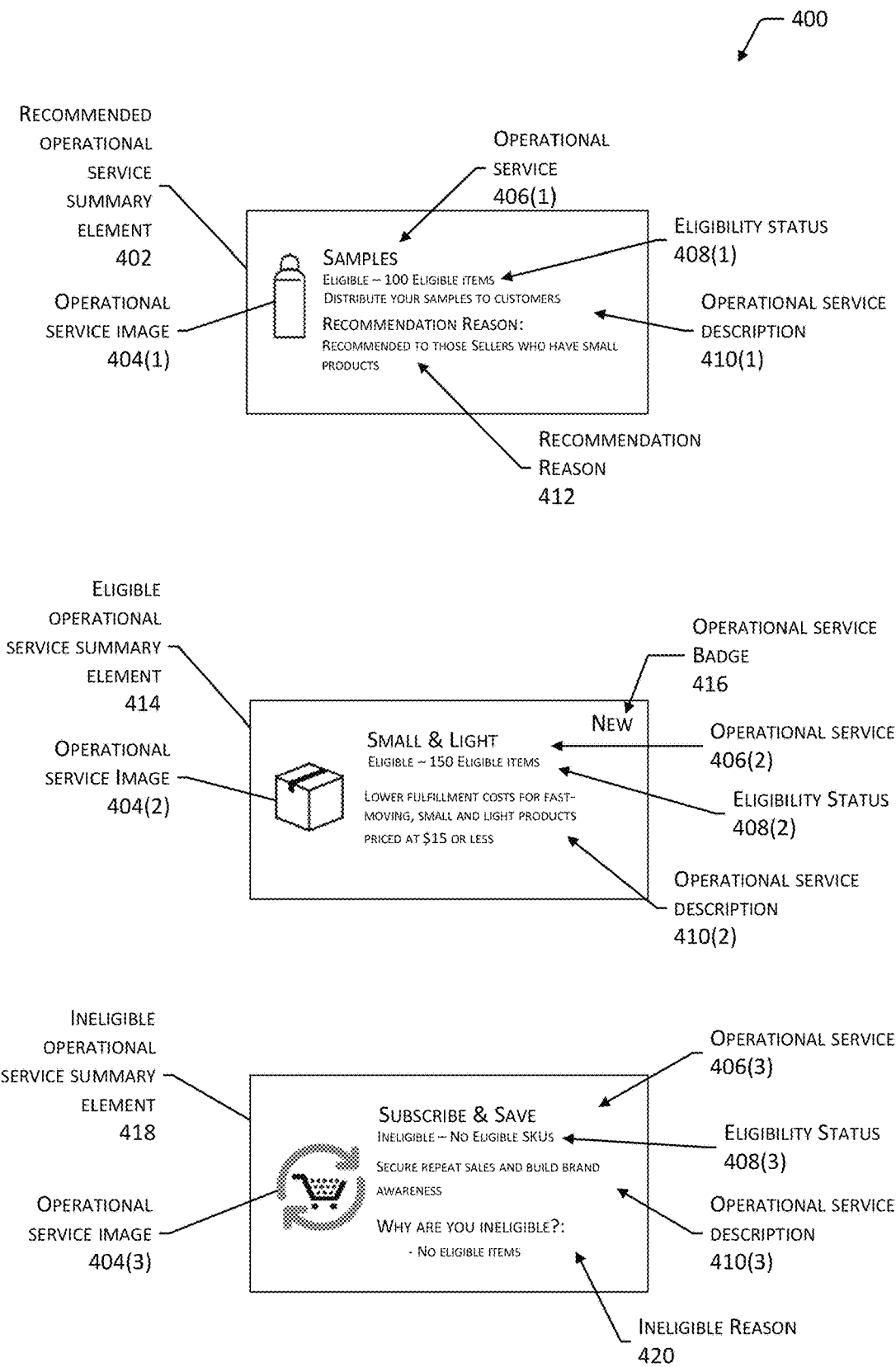
FIG. 4 is an example of individual summary elements, according to one implementation.

FIG. 4 is an example 400 of individual summary elements, according to one implementation. The summary elements 310 may include a recommended operational service summary element 402. The recommended operational service summary element 402 may include a limited list of information. The limited list of information may include an operational service image 404(1), operational service 406(1), eligibility status 408(1), operational service description 410(1), recommendation reason 412(1), and so forth.

The operational service image 404(1) may be associated with and visually descriptive of the operational service 406(1). For example, the operational service 406(1) may be a sample operational service. The operational service image 404(1) may be an image of an item in a sample form. The operational service image 404(1) may be located or presented proximately to the left of the operational service 406(1). The operational service 406(1) may be a title of the recommended operational service summary element 402 and prominent. For example, the operational service 406(1) may have the title of "Samples" in large bold font. The eligibility status 408(1) may be located proximately below the operational service 406(1) and proximately to the right of the operational service image 404(1). The eligibility status 408(1) may have a font size smaller than the font size used for the operational service 406(1).

The eligibility status 408(1) may indicate whether the seller partner 202 is eligible for the recommended operational service summary element 402. The eligibility status 408(1) may indicate a number of items eligible for the recommended operational service summary element 402. For example, the eligibility status 408(1) may indicate that the seller partner 202 may have one hundred (100) eligible items.

The operational service description 410(1) may include a description of the recommended operational service summary element 402. The description may be brief, such as two (2) to three (3) sentences. In other implementations, the description may be a number of characters long, such as twenty-five (25) characters. The operational service description 410(1) may be located or presented proximately below the eligibility status 408(1).

The recommendation reason 412 may include information indicating a reason the recommended operational service summary element 402 is recommended. For example, the recommendation reason 412 may recommend the recommended operational service summary element 402 based on the number of items eligible. In another example, the recommendation reason 412 may be based on a number of items purchased, information provided by the seller partner 202, such as current or forecasted business metrics, and so forth. The recommendation reason 412 may be located proximate to a bottom edge of or below the operational service description 410(1).

In other implementations, the location or presentation the operational service image 404(1), the operational service 406(1), the eligibility status 408(1), the operational service description 410(1), the recommendation reason 412, and so forth may be interchangeable. For example, the recommendation reason 412 may be located at the top and the operational service image 404(1) being located to the right of the recommendation reason 412. In this example, the operational service 406(1) may be listed proximately below the recommendation reason 412, followed by the operational service description 410(1) and the eligibility status 408(1).

In another implementation, the summary elements 310 may include an eligible operational service summary element 414. The eligible operational service summary element 414 may include a limited list of information. The limited list of information may include an operational service image 404(2), operational service 406(2), eligibility status 408(2), operational service description 410(2), operational service badge 416, and so forth. The information provided and location or presentation of the operational service image 404(2), the operational service 406(2), and the eligibility status 408(2), and the operational service description 410(2) may be similar to the operational service image 404(1), the operational service 406(1), the eligibility status 408(1), and the operational service description 410(2), as described above. The operational service badge 416 may be presented for the discovery summary element 216, the summary elements 310, the recommended operational service summary element 402, ineligible operational service summary element 418, and so forth. The operational service badge 416 may appear for newly added operational services 204. The operational service badge 416 may appear for a period of time. For example, the operational service badge 416 may appear for a number of days, weeks, or months, or it may appear until the seller partner 202 enrolls in the operational service 204, has viewed the operational service 204, and so forth. The operational service badge 416 may be located or presented proximately in a corner of the summary element 310.

In other implementations, the summary elements 310 may include an ineligible operational service summary element 418. The ineligible operational service summary element 418 may include a limited list of information. The limited list of information may include an operational service image 404(3), operational service 406(3), eligibility status 408(3), operational service description 410(3), ineligible reason 420, and so forth. The information provided and location or presentation of the operational service image 404(3), the operational service 406(3), the eligibility status 408(3), and the operational service description 410(3) may be similar to the operational service image 404(1), the operational service 406(1), the eligibility status 408(1), and the operational service description 410(1), as described above. The ineligible reason 420 may include a reason for ineligibility. The reason may be a list the includes the seller partner 202, or specific item and a requirement that the seller partner 202 may fulfill. For example, the reason may indicate that the number of items that the seller partner 202 offers does not meet or exceed an item threshold. In this example, the seller partner may be able to fulfill this requirement by increasing the number of items to meet or exceed the item threshold. In other implementations, the reason may indicate a requirement for which the seller partner cannot take an action to become eligible. For example, the user device 102 that the seller partner 202 used may be incompatible to use with the particular operational service 204. The ineligible reason 420 may be located or presented proximately towards the bottom of the included ineligible operational service summary element 418 or below the operational service description 410(3). In other implementations, the ineligible reason 420 may be located or presented in different locations, as described above. The ineligible reason 420 may include a limited amount of information about criteria to become eligible for the one or more ineligible operational services 204. For example, the limited information may indicate that when the seller partner 202 enrolls a certain number of items or achieves a particular customer review rating the seller partner 202 may become eligible to enroll in the operational service 204.

Figure 5:
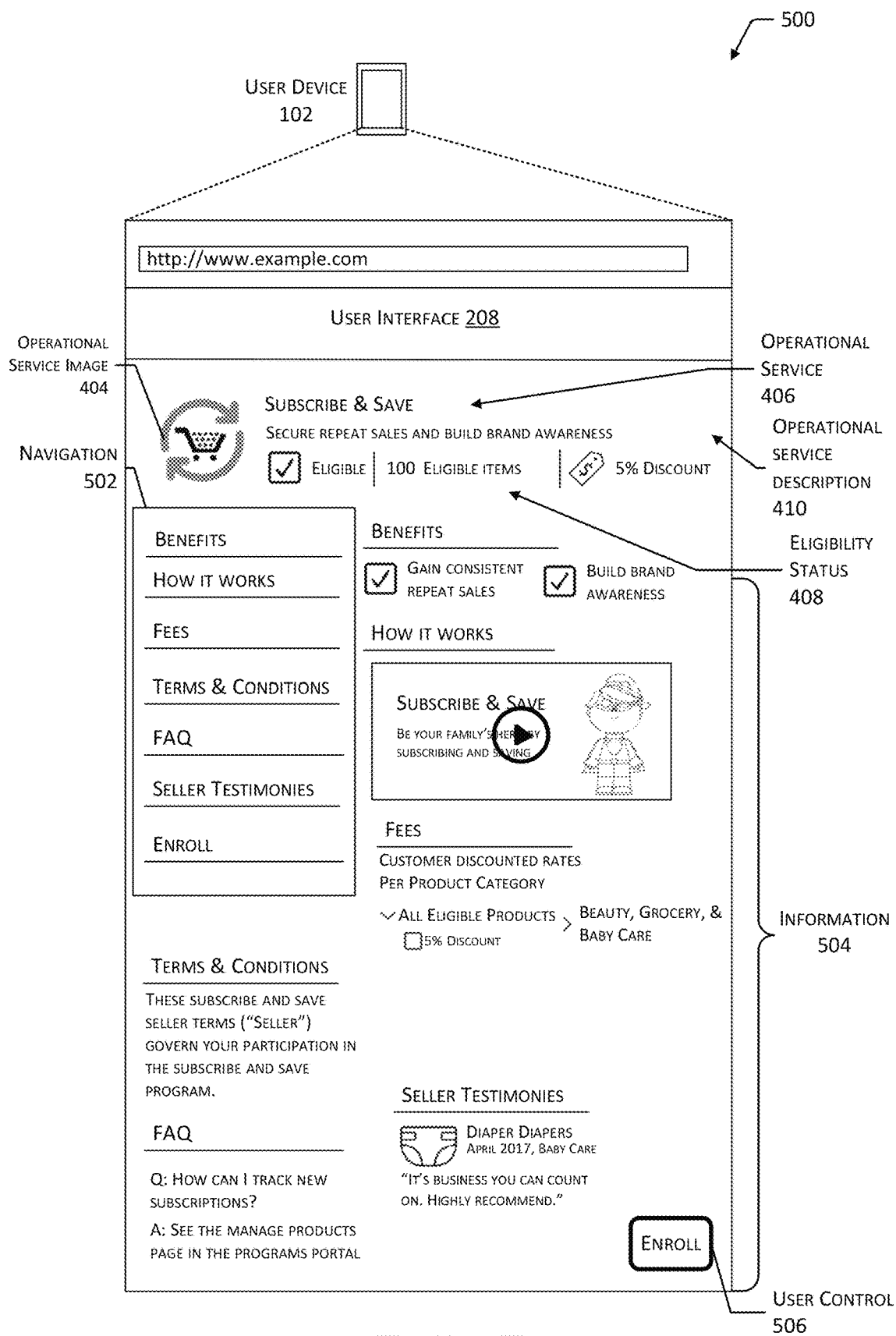
FIG. 5 is an example of a user interface that enables a seller partner to manage and view an operational service, according to one implementation.

FIG. 5 is an example 500 of a user interface 208 that enables a seller partner 202 to manage and view an operational service 204, according to one implementation. The example 500 may include the user device 102, as described above. The user device 102 may include the user interface 208. The user interface 208 may be configured to present an individual operational service 204. For example, the user interface 208 may present the subscribe and save operational service page. In one implementation, that user interface 208 may present the subscribe and save operational service based on receiving a user input selecting the summary element 310 corresponding to the subscribe and save operational service. The presentation of the subscribe and save operational service may be an overlay on the operational service portal 302. For example, the user device 102 may receive the user input selecting the summary element 310 corresponding to the subscribe and save operational service. The user device 102 may, rather than opening a new page, cause the user interface 208 to present the subscribe and save operational service page as an overlay. By providing an overlay the seller partner 202 may be able to reduce the need to scroll around and switch views many times to find the right data or functionality. In other implementations, the user device 102 may cause the user interface 208 to present the subscribe and save operational service page.

The presentation of the subscribe and save operational service page may include a limited amount of information. For example, the limited amount of information may include the operational service image 404, the operational service 406, the eligibility status 408, the operational service description 410, and so forth, as described above.

The user interface 208 may present navigation 502. The navigation 502 may include a list of section headers or widgets. The individual section headers or widgets may be configured to receive a user input and cause the user device 102 to present the corresponding section. For example, the user device 102 may receive a user input selecting the benefits section header. The selection may cause the user interface 208 to present the benefits of the operational service 204. The list of section headers may include benefits, how it works, fees, terms and conditions, frequently asked questions (FAQ), seller testimonies, enroll, and so forth.

The user interface 208 may present information 504. The information 504 may include a brief or short list of information for the individual section headers. For example, the user interface 208 may present the benefits section, how it works section, fees section, terms and conditions section, FAQ section, seller testimonies section, user control 506 to enroll in the operational service 204, and so forth. In one implementation, the short list of information for the benefits section may include that the subscribe and save operational service may provide gaining consistent, repeat sales and build brand awareness. In other implementations, the short list of information may include all the benefits a seller partner 202 may receive when they enroll in the operational service 204. In another implementation, the user interface 208 may present a button control that displays a directional arrow that may be used as a toggle button to expand or collapse the benefit section. When expanded, the user interface 208 may display all of the benefits associated with an operational service 204.

The short list of information associated with the how it works section may include a video that a seller partner 202 may view to learn about the operational service 204. For example, the video may explain that the subscribe and save operational service enables a customer to subscribe to receive an item at a discounted price and receives the item at regular intervals, such as receiving an order of baby diapers every thirty (30) days. The short list of information may also include a written section that explains how the operational service 204 works. For example, the written section may explain that when a customer subscribes to purchase a particular item for a particular interval, they receive the item at a discount. The written section may explain that while the customer is purchasing the item at a reduced price, the seller partner 202 is gaining a consistent repeat sale, which is a benefit of the service 204. In one implementation, the written section may be presented to the seller partner 202 based on the user device 102 receiving a user input selecting the how it works section header in the navigation 502. In another implementation, the written section may be presented to the seller partner 202 when the user device 102 receives a user input selecting the toggle button, as described above.

The short list of information associated with the fees section may include the cost to enroll in the operational service 204, discounts that a customer may receive, and so forth. For example, the fees section may include that by enrolling in the subscribe and save operational service that customers may receive a 5% discount on items sold by the seller partner 202. Other implementations of the fees section are described in more detail below.

The short list of information associated with the terms and conditions section may include a brief overview of the general and special arrangements, provisions, requirements, rules, specifications, and standards for the operational service 204. For example, the terms and conditions section may indicate that the provisions in the terms and conditions governs that the seller partner 202 have a particular number of items available to purchase. In other implementations, the selection of the toggle switch as described above may cause the user interface 208 to present the entirety of the terms and conditions section, as described above.

The short list of information associated with the FAQ section may include the most frequently asked question. For example, the question of how a seller partner 202 can track new subscriptions may be the most frequently asked question. The short list of information may also include the answer to the most frequently asked question. In other implementations, the selection of the toggle switch as described above may cause the user interface 208 to present the entirety of the FAQ section, as described above.

The short list of information associated with the seller testimonies section may include the most frequently viewed seller testimony, highest rated testimony, lowest rated testimony, and so forth. For example, the seller testimony may include a star ranking, such as five out of five stars, a headline, experience or thoughts such as what the customer liked or disliked, what did they use the item for, and so forth. In other implementations, the selection of the toggle switch as described above may cause the user interface 208 to present the entirety of the seller testimonies section.

The user control 506 may enable the seller partner 202 to enroll in the operational service 204. For example, the user control 506 may receive user input of the seller partner 202 selecting to enroll in the subscribe and save operational service. In other implementations, the user device 102 or the computing device 212 may determine that a number of items associated with the first data is eligible to enroll in the one or more operational services 204. The user device 102 may generate the user interface 208 to actuate a change from a first user control to a second user control. For example, the user device 102 may determine that the seller partner 202 is eligible for the operational service 204. The user interface 208 may change the user control 506 from a first user control that is configured to not receive a user input to a second user control configured to receive a user input to enroll in the operational service 204.

The location or presentation of the navigation 502 may be proximate to a left edge of the user interface 208 and below the operational service image 404, the operational service 406, the eligibility status 408, and the operational service description 410. The short list of information corresponding to the individual section headers may be located or presented proximately to the right of the navigation 502 and in an order corresponding to the order that the section headers are presented in the navigation 502. For example, the benefits section may be presented first proximately below the operational service image 404, the operational service 406, the eligibility status 408, and the operational service description 410. The how it works section may be presented below the benefits section and subsequently the fees section, terms and conditions section, FAQ section, seller testimonies section, and the user control 506 may follow.

By using the example 500 described herein, the seller partner 202 is able to utilize a significantly simplified user interface 208 to discover, learn about, enroll in, and manage the various operational services 204, as compared to FIG. 1. As illustrated in FIG. 5 information about the operational services 204 is readily accessible, such as the benefits a seller partner 202 would receive, how the operational service works, the fees associated with the operational service, terms and conditions, and so forth. By having the pertinent information presented it enables the seller partner 202 faster and more reliable decision making and reduces the time and effort needed to acquire information needed to make a choice and implement that choice with regard to operational services 204.

Figure 6A:
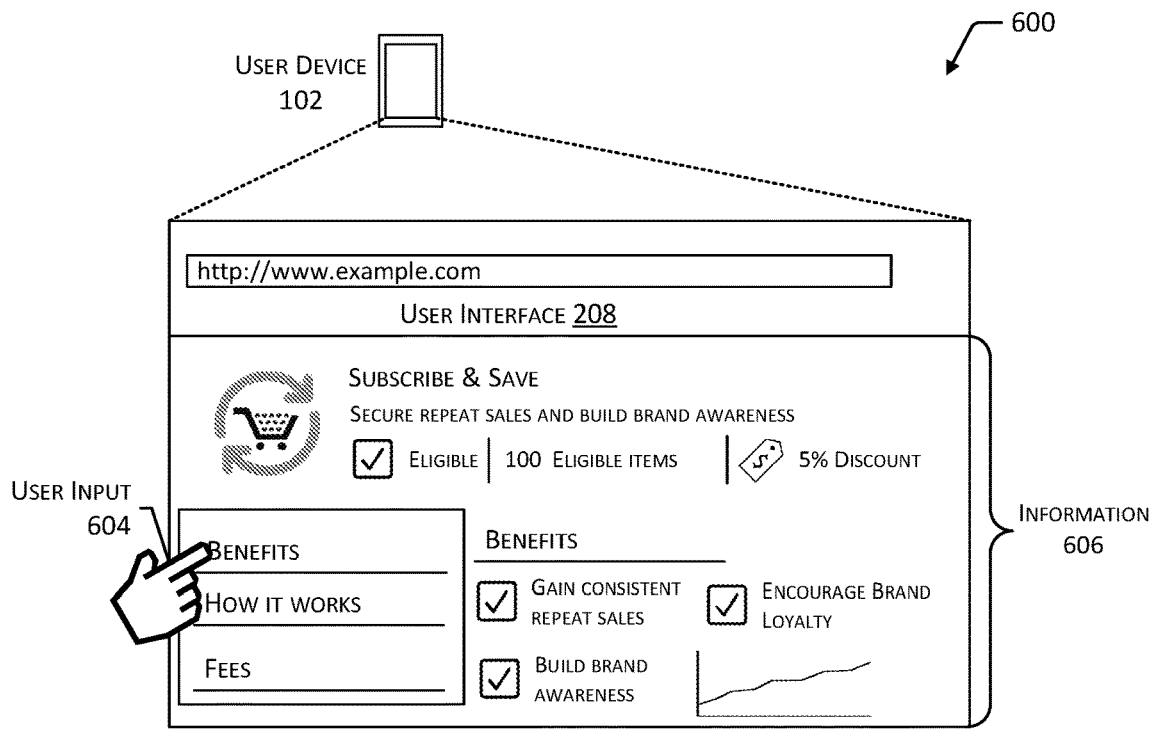
FIGS. 6A and 6B are examples of a user interface that enables a seller partner to manage and view a benefits summary element, according to one implementation.
Figure 6B:
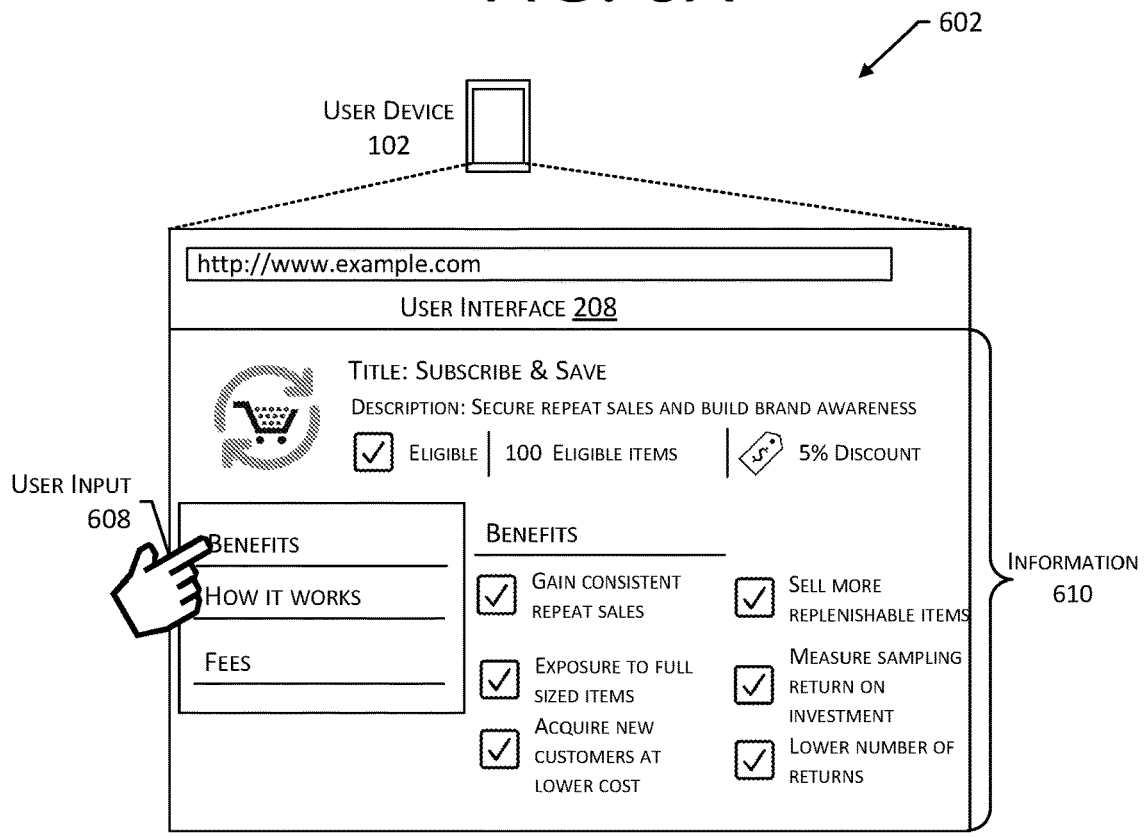

FIGS. 6A and 6B are examples 600 and 602 of a user interface 208 that enables a seller partner 202 to manage and view a benefits summary element, according to one implementation. As illustrated in the example 600 the user device 102 may receive user input 604. The user input 604 may be a selection of the benefits section. The user input 604 may cause the user interface 208 to present information 606. The information 606 may be a template that showcases the top three (3) benefits of the operational service 204. For example, the top three (3) benefits of the subscribe and save operational service may be gain consistent repeat sales, build brand awareness, build brand loyalty, and encourage brand loyalty. The order of the top three (3) benefits being presented may be in no particular order or may be in a ranked order. The short list of benefits may be located proximately to the right of the navigation 502, proximately below the eligibility status 408, the operational service image 404, the operational service description 410, or a combination thereof.

By using the example 600 described herein, the seller partner 202 is able to utilize a significantly simplified user interface 208 to discover, learn about, and make a faster and more reliable decision by having the pertinent information presented.

As illustrated in the example 602 the user device 102 may receive user input 608. The user input 608 may be a selection of the benefits section. The user input 608 may cause the user interface 208 to present information 610. The information 610 may be a template that showcases several of the benefits of the operational service 204. For example, the benefits associated with enrolling in the subscribe and save operational service presented in the user interface 208 may include, gain consistent repeat sales, get your samples in front of customers, exposure to full sized items, acquire new customers at a lower cost, sell more replenishable items, measure sampling return on investment, lower number of returns, and so forth. The order of the benefits being presented may be in no particular order or may be in a ranked order. The short list of benefits may be located proximately to the right of the navigation 502, proximately below the eligibility status 408, the operational service image 404, the operational service description 410, or a combination thereof.

By using the examples described in FIGS. 6A and 6B, the seller partner 202 is able to utilize a significantly simplified user interface 208 to discover, learn about, and make a faster and more reliable decision by having the pertinent information presented.

The information 606 and 610 may include the operational service image 404, the operational service 406, the eligibility status 408, the operational service description 410, and so forth as described above. The location and the presentation of the information 606 and 610 may correspond to the locations and presentations described above.

The presentation of the benefits section associated with the operational service 204 may be an overlay on the operational service portal 302 or the home page associated with the operational service 204. For example, the user device 102 may receive the user input 602, 608 selecting the benefits section. The user device 102 may, rather than opening a new page, cause the user interface 208 to present the benefits section as an overlay over the subscribe and save operational service page. By providing an overlay, the seller partner 202 may be able to reduce the need to scroll around and switch views many times to find the right data or functionality. In other implementations, the user device 102 may cause the user interface 208 to present the page associated with the benefits section as a new page.

Figure 7:
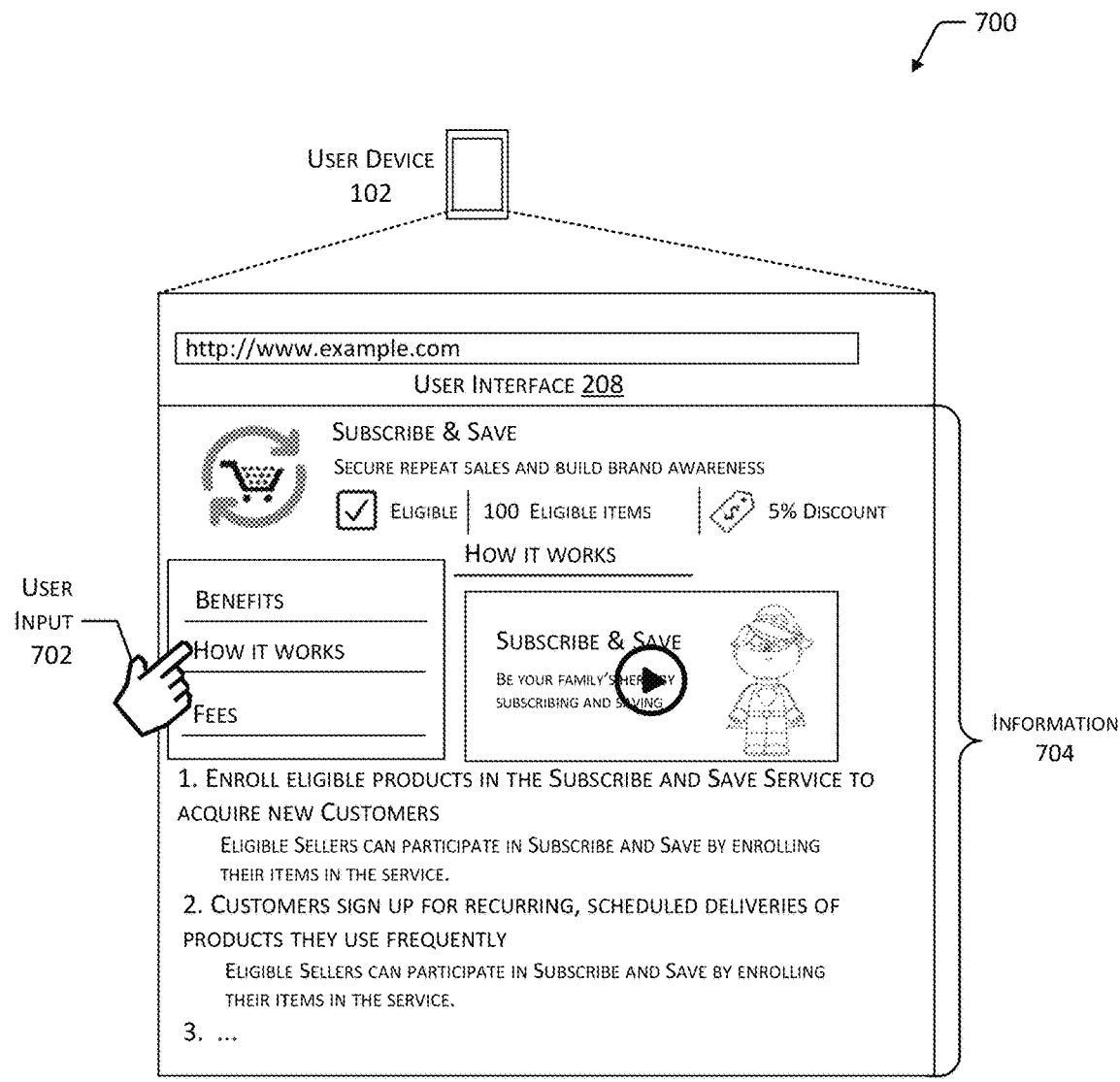
FIG. 7 is an example of a user interface that enables a seller partner to manage and view information about an operational service, according to one implementation.

FIG. 7 is an example 700 of a user interface 208 that enables a seller partner 202 to manage and view information about an operational service 204, according to one implementation. The example 700 may include the user device 102. The user device 102 may include the user interface 208 that may be configured to present the how it works section associated with the operational service 204. For example, the user interface 208 may present the how it works section associated with the subscribe and save operational service based on user input 702. The user interface 208 may present information 704. The information 704 may include the operational service image 404, the operational service 406, the eligibility status 408, the operational service description 410, and so forth as described above. The location and the presentation of the information 704 may correspond to the locations and presentations described above.

The information 704 may be presented in a template that outlines steps of how the program works for the seller partner 202 as well as the user experience. The information 704 may include a video to enable seller partners 202 to understand the user experience. The video may be located proximately to the right of the navigation 502, proximately below the eligibility status 408, the operational service image 404, the operational service description 410, or a combination thereof. The information 704 may include a written section presented proximately below the video. The written section may correspond to the video. For example, the written section may be a transcript of the video. The transcript may highlight important information. For example, the written section or transcript may highlight through the use of larger font, bolding the text, underlining, italics, or a combination thereof, "Enroll Eligible Products In The Subscribe And Save Service To Acquire New Customers" and may be located proximately below the navigation 502, proximately below the eligibility status 408, the operational service image 404, the operational service description 410, or a combination thereof.

The presentation of the how it works section associated with the operational service 204 may be an overlay on the operational service portal 302 or the home page associated with the operational service 204. For example, the user device 102 may receive the user input 702 selecting the how it works section. The user device 102 may, rather than opening a new page, cause the user interface 208 to present the how it works section as an overlay over the subscribe and save operational service page. By providing an overlay the seller partner 202 may be able to reduce the need to scroll around and switch views many times to find the right data or functionality. In other implementations, the user device 102 may cause the user interface 208 to present the page associated with the how it works section as a new page.

In other implementations, the template used to present the information 704 may be customized to a particular operational service 204. For example, the particular operational service 204 may want to include a contact us section to be included in the information 704. The template may be customized to include the contact us section, which may be located at the bottom of the user interface 208. The contact us section may include information such as a contact phone number, electronic mail address, website, and so forth.

In another implementation, the template may be modified to include additional or different information to be included in the information 704. For example, a particular operational service 204 may include an enrollment process section. The particular operational service 204 may reuse the how it works template of including a video and a written section that may correspond to the video. The modified template may include, below each section of the written section, an estimated time text line. For example, the template may include a heading that indicates enrollment process and then below the heading have a list of one or more steps. Below each of the steps may be the text line indicating the amount of time. For example, the step may include that training is required with the warehouse management system. The estimated time listed below the step may indicate one (1) week.

Figure 8:
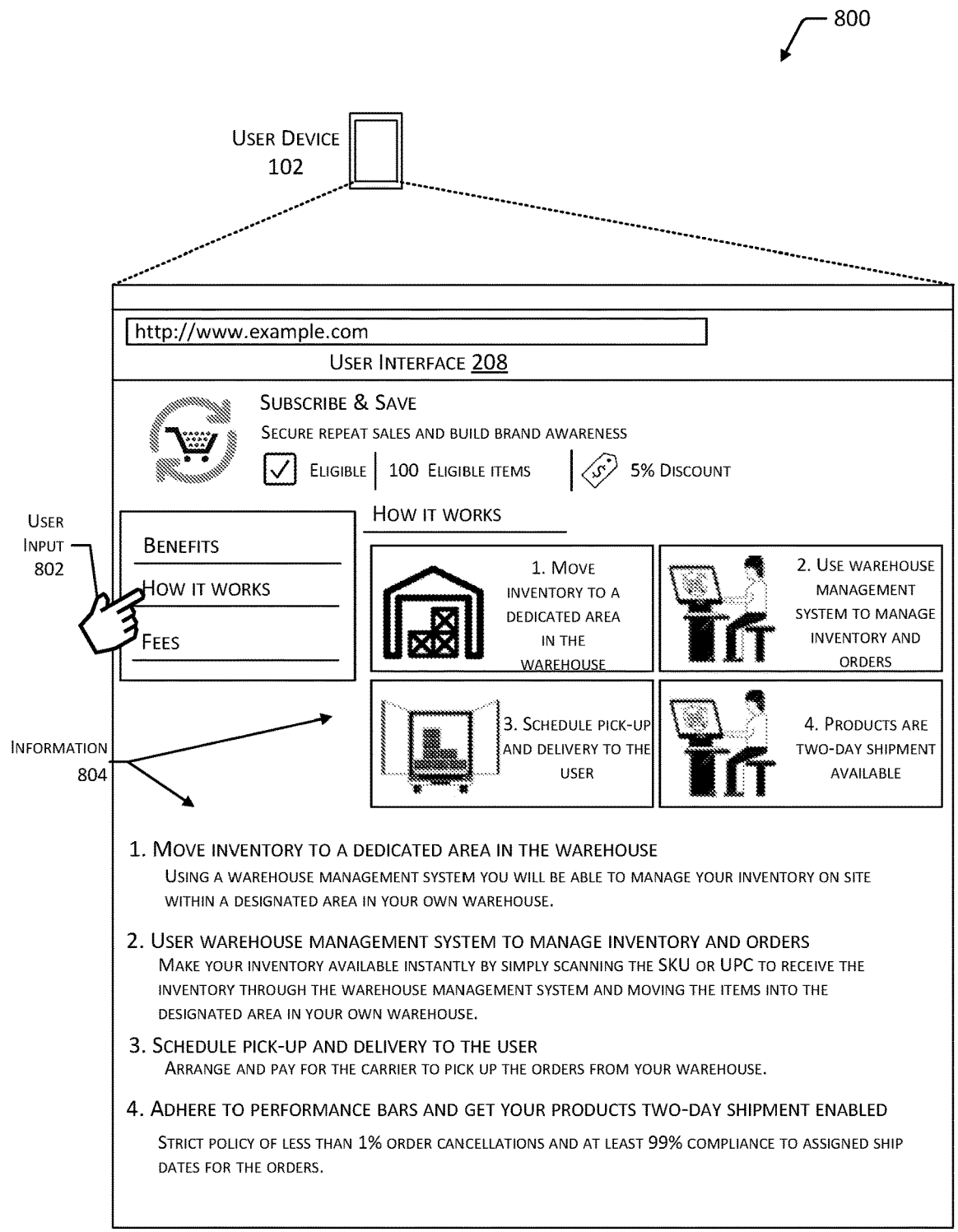
FIG. 8 is an example of a user interface that enables a seller partner to manage and view information about an operational service, according to another implementation.

FIG. 8 is an example 800 of a user interface 208 that enables a seller partner 202 to manage and view information about an operational service 204, according to another implementation. The example 800 may include the user device 102. The user device 102 may include the user interface 208. The user interface 208 may be configured to present the how it works section associated with the operational service 204. For example, the user interface 208 may present the how it works section associated with the subscribe and save operational service based on user input 802. The user interface 208 may present information 804. The information 804 may include the operational service image 404, the operational service 406, the eligibility status 408, the operational service description 410, and so forth as described above. The location and the presentation of the information 804 may correspond to the locations and presentations described above.

The information 804 may be presented in a template that outlines steps of how the operational service 204 works for the seller partner 202 as well as the user experience of the customer purchasing one or more items from the seller partner 202. The user experience may be customer reviews that indicate their experience. For example, the customer reviews may indicate that the users enjoy the ability to subscribe and save on particular items, as this enables the customer to not worry about remembering to order the item. The information 804 may include one or more images illustrating how the operational service 204 works. The one or more images may include one or more image descriptions associated with the one or more images. The information 804 may include a written section presented proximately below the one or more images. The written section may provide further details about how the operational service 204 works. For example, the written description may describe that the seller partner 202 is to move item inventory to a dedicated area in a warehouse, employ a user warehouse management system to manage inventory and orders, schedule pick-up and delivery to a user, adhere to performance bars and get your items two-day shipment enabled, and so forth. The written section may include further details such as for adhering to performance bars the written section may include that there is a strict policy of less than 1% order cancellations and at least 99% compliance to assigned ship dates for the orders. The individual headings within the written section may by highlighted to differentiate between the details located below the headings. For example, the headings may be of larger font, bold, underlined, italicized, or a combination thereof.

The presentation of the how it works section associated with the operational service 204 may be an overlay on the operational service portal 302 or the home page associated with the operational service 204. For example, the user device 102 may receive the user input 802 selecting the how it works section. The user device 102 may, rather than opening a new page, cause the user interface 208 to present the how it works section as an overlay over the subscribe and save operational service page. By providing an overlay the seller partner 202 may be able to reduce the need to scroll around and switch views many times to find the right data or functionality. In other implementations, the user device 102 may cause the user interface 208 to present the page associated with the how it works section as a new page.

Figure 9:
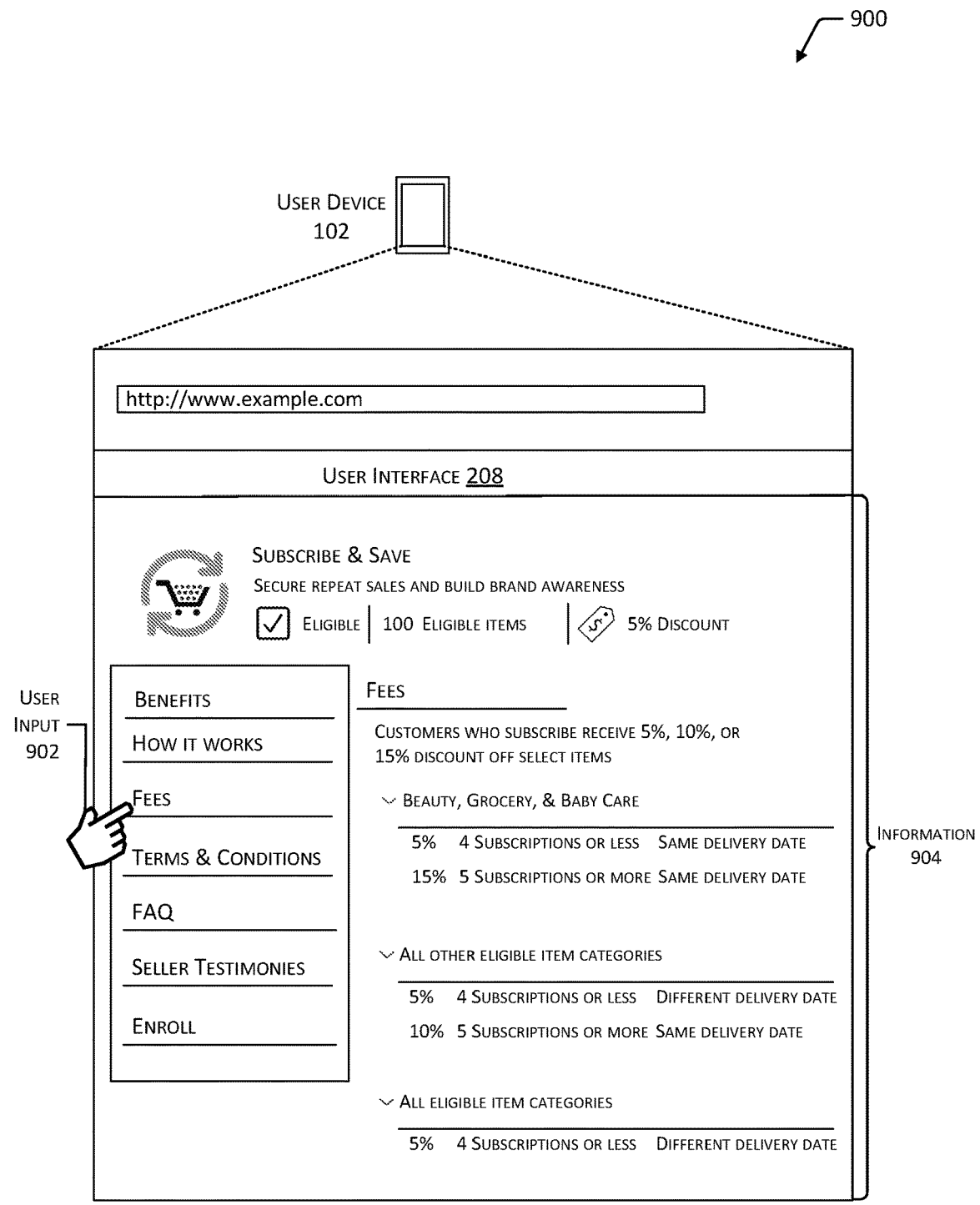
FIG. 9 is an example of a user interface that enables a seller partner to manage and view fee information about an operational service, according to one implementation.

FIG. 9 is an example 900 of a user interface 208 that enables a seller partner 202 to manage and view fee information about an operational service 204, according to one implementation. The fee information presented may be specific to a particular operational service 204. The example 900 may include the user device 102. The user device 102 may include the user interface 208. The user interface 208 may be configured to present the fees associated with the operational service 204. For example, the user interface 208 may present the fees associated with the subscribe and save operational service based on user input 902. The user interface 208 may present information 904. The information 904 may include the operational service image 404, the operational service 406, the eligibility status 408, the operational service description 410, and so forth as described above. The location and the presentation of the information 904 may correspond to the locations and presentations described above.

The information 904 may also include the fees or fee structure associated with the operational service 204. For example, the user interface 208 may present that when the seller partner 202 subscribes to 4 or less items in the "Beauty, Grocery, and Baby Care" category the seller partner 202 may receive a 5% discount and receive same day delivery. The user interface 208 may also present that when the seller partner 202 subscribes to 5 or more items in the "Beauty, Grocery, and Baby Care" category the seller partner 202 may receive a 15% discount and receive same day delivery. In other examples, the user interface 208 may present that when the seller partner 202 subscribes 4 or less items that are eligible that the user may receive a 5% discount and receive different delivery date.

By using the example 900 described herein, the seller partner 202 is able to utilize a significantly simplified user interface 208 to discover, learn about, enroll in, and manage the various operational services 204, as compared to FIG. 1. As illustrated in FIG. 9 information about the fees or fee structure associated with the operational service 204 is readily accessible, allowing for faster and more reliable decision making and reducing the time and effort needed for the seller partner 202 to acquire information needed to make a choice and implement that choice with regard to the operational service 204.

The presentation of the fees section associated with the operational service 204 may be an overlay on the operational service portal 302 or the home page associated with the operational service 204. For example, the user device 102 may receive the user input 902 selecting the fee section. The user device 102 may, rather than opening a new page, cause the user interface 208 to present the fee section as an overlay over the subscribe and save operational service page. By providing an overlay the seller partner 202 may be able to reduce the need to scroll around and switch views many times to find the right data or functionality. In other implementations, the user device 102 may cause the user interface 208 to present the page associated with the fee section as a new page.

Figure 10:
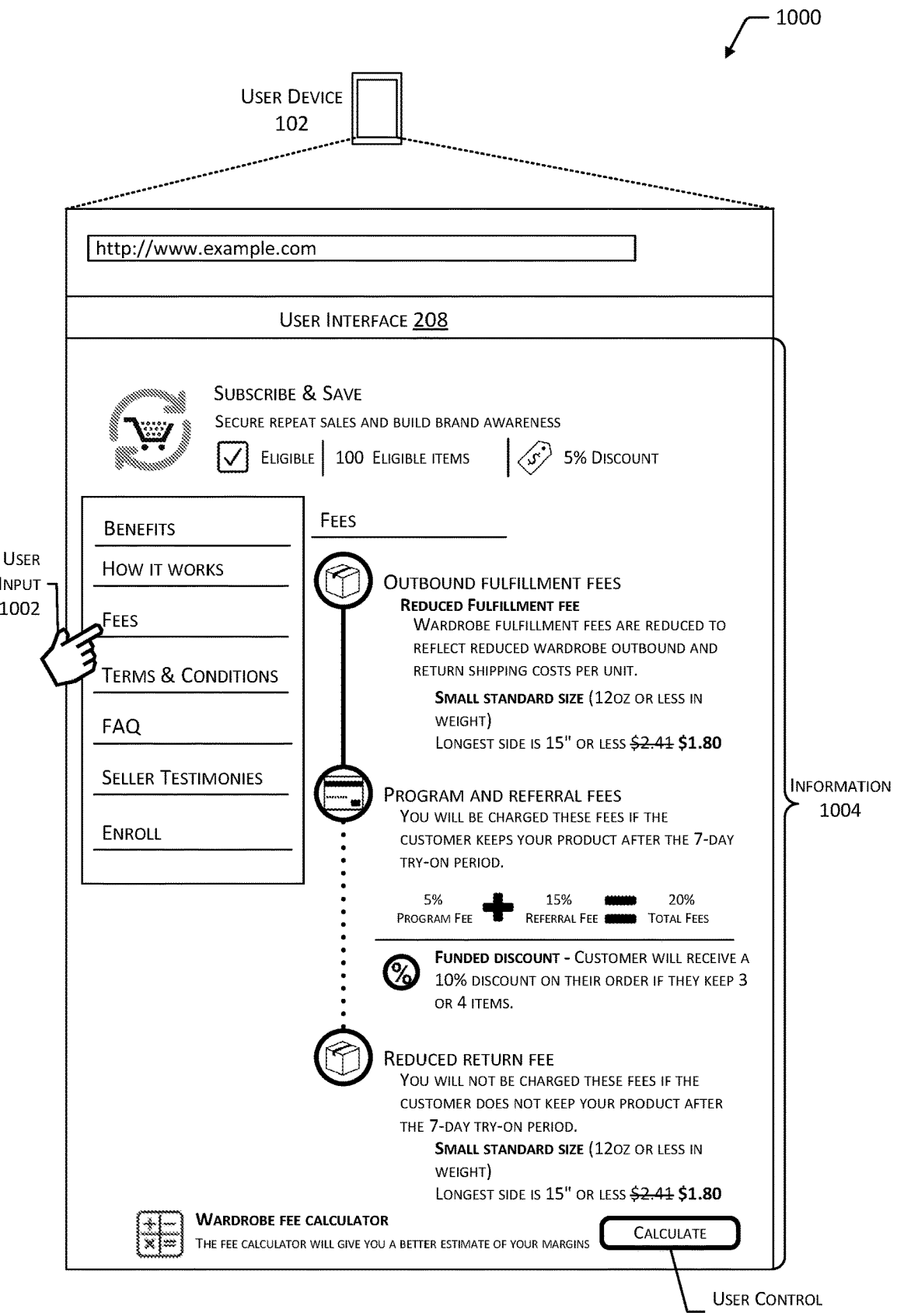
FIG. 10 is an example of a user interface that enables a seller partner to manage and view fee information about an operational service, according to another implementation.

FIG. 10 is an example 1000 of a user interface 208 that enables a seller partner 202 to manage and view fee information about an operational service 204, according to another implementation. The example 1000 may include the user device 102. The user device 102 may include the user interface 208. The user interface 208 may be configured to present the fees associated with the operational service 204. For example, the user interface 208 may present the fees associated with the subscribe and save operational service based on user input 1002. The user interface 208 may present information 1004. The information 1004 may include the operational service image 404, the operational service 406, the eligibility status 408, the operational service description 410, and so forth as described above. The location and the presentation of the information 1004 may correspond to the locations and presentations described above.

The information 1004 may also include the fees or fee structure associated with the operational service 204. For example, the user interface 208 may present outbound fulfillment fees, program and referral fees, reduced return fee, and so forth. The outbound fulfillment fees may include a reduced fulfillment fee. For example, wardrobe fulfillment fees may be reduced to reflect reduced wardrobe outbound and return shipping costs per unit. In this example, a small standard size shipment (12 oz or less in weight) may receive a reduction in fulfillment fee from $2.41 to $1.80. The program and referral fees may indicate that the seller partner 202 may be charged fees if the user 206 retains the item after a 7-day period of time. The program and referral fees section may further provide a breakdown of the entire fee. For example, the user interface 208 may present that of the 20% total fee that 5% goes to the program fee and 15% goes to the referral fee. The program and referral fees section may include a funded discount. The funded discount may indicate that users 206 may receive a 10% discount on their order when they keep 3 or 4 items. The reduced return fee may indicate that the seller partner 202 may not be charged these fees when the user 206 does not keep the items after a 7-day try-on or use period.

The information 1004 may include a fee calculator and a user control 1006 configured to receive a user input and calculate the fees associated with the operational service 204. The fee calculator provides a better estimate to the seller partner 202 to determine the margins associated with the selling of one or more items.

By using the example 1000 described herein, the seller partner 202 is able to utilize a significantly simplified user interface 208 to discover, learn about, enroll in, and manage the various operational services 204, as compared to FIG. 1. As illustrated in FIG. 10 information about the fees or fee structure associated with the operational service 204 is readily accessible, allowing for faster and more reliable decision making and reducing the time and effort needed for the seller partner 202 to acquire information needed to make a choice and implement that choice with regard to the operational service 204.

The presentation of the fee section associated with the operational service 204 may be an overlay on the operational service portal 302 or the home page associated with the operational service 204. For example, the user device 102 may receive the user input 1002 selecting the fee section. The user device 102 may, rather than opening a new page, cause the user interface 208 to present the fee section as an overlay over the subscribe and save operational service page. By providing an overlay the seller partner 202 may be able to reduce the need to scroll around and switch views many times to find the right data or functionality. In other implementations, the user device 102 may cause the user interface 208 to present the page associated with the fee section as a new page.

Figure 11:
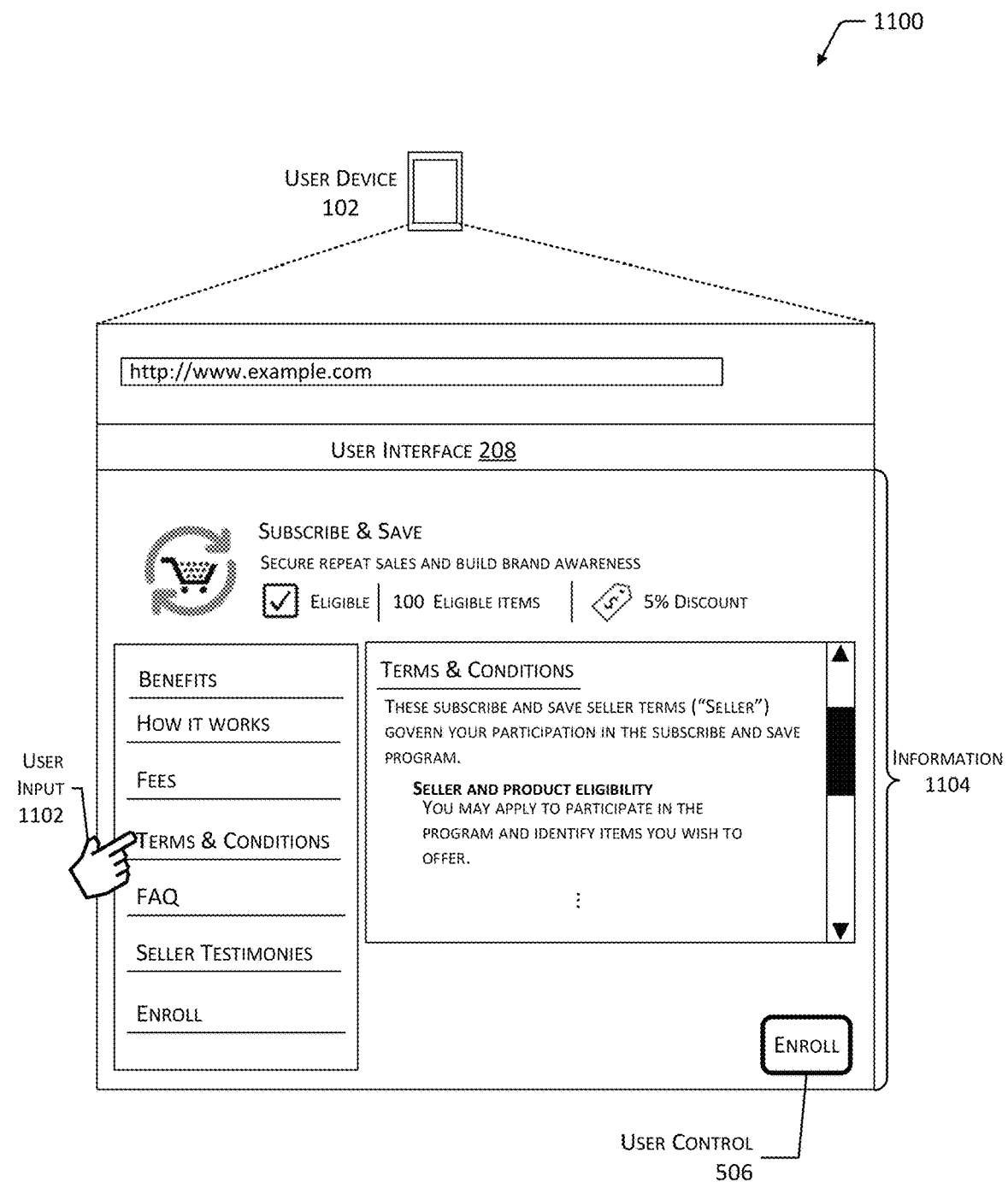
FIG. 11 is an example of a user interface that enables a seller partner to manage and view terms and conditions information about an operational service, according to one implementation.

FIG. 11 is an example 1100 of a user interface 208 that enables a seller partner 202 to manage and view terms and conditions information about an operational service 204, according to one implementation. The example 1100 may include the user device 102. The user device 102 may include the user interface 208. The user interface 208 may be configured to present the terms and conditions associated with the operational service 204. For example, the user interface 208 may present the terms and conditions associated with the subscribe and save operational service based on user input 1102. The user interface 208 may present information 1104. The information 1104 may include the operational service image 404, the operational service 406, the eligibility status 408, the operational service description 410, and so forth asdescribed above. The location and the presentation of the information 1104 may correspond to the locations and presentations described above.

The information 1104 may also include the terms and conditions associated with the operational service 204. The terms and conditions may comprise one or more of hypertext markup language (HTML), scripts, executable code, graphics, video, audio, and so forth. The terms and conditions may be general or special arrangements, provisions, requirements, rules, specifications, and standards that form an integral part of an agreement between the seller partner 202 and the store. In other implementations, the terms and conditions section may automatically update when the terms and conditions are modified. The terms and conditions may be viewable in a scroll window and outline the seller partner 202 and item eligibility requirements.

The user interface 208 may include the user control 506. The user control 506 may enable the seller partner 202 to enroll in the operational service 204. For example, the user control 506 may receive user input of the seller partner 202 selecting to enroll in the subscribe and save operational service. By selecting the user control 506 the seller partner 202 indicates that they accept and agree with the terms and conditions for the particular operational service 204.

The presentation of the terms and conditions section associated with the operational service 204 may be an overlay on the operational service portal 302 or the homepage associated with the operational service 204. For example, the user device 102 may receive the user input 1102 selecting the terms and conditions section. The user device 102 may, rather than opening a new page, cause the user interface 208 to present the terms and conditions section as an overlay over the subscribe and save operational service page. By providing an overlay the seller partner 202 may be able to reduce the need to scroll around and switch views many times to find the right data or functionality. In other implementations, the user device 102 may cause the user interface 208 to present the page associated with the terms and conditions section as a new page.

Figure 12:
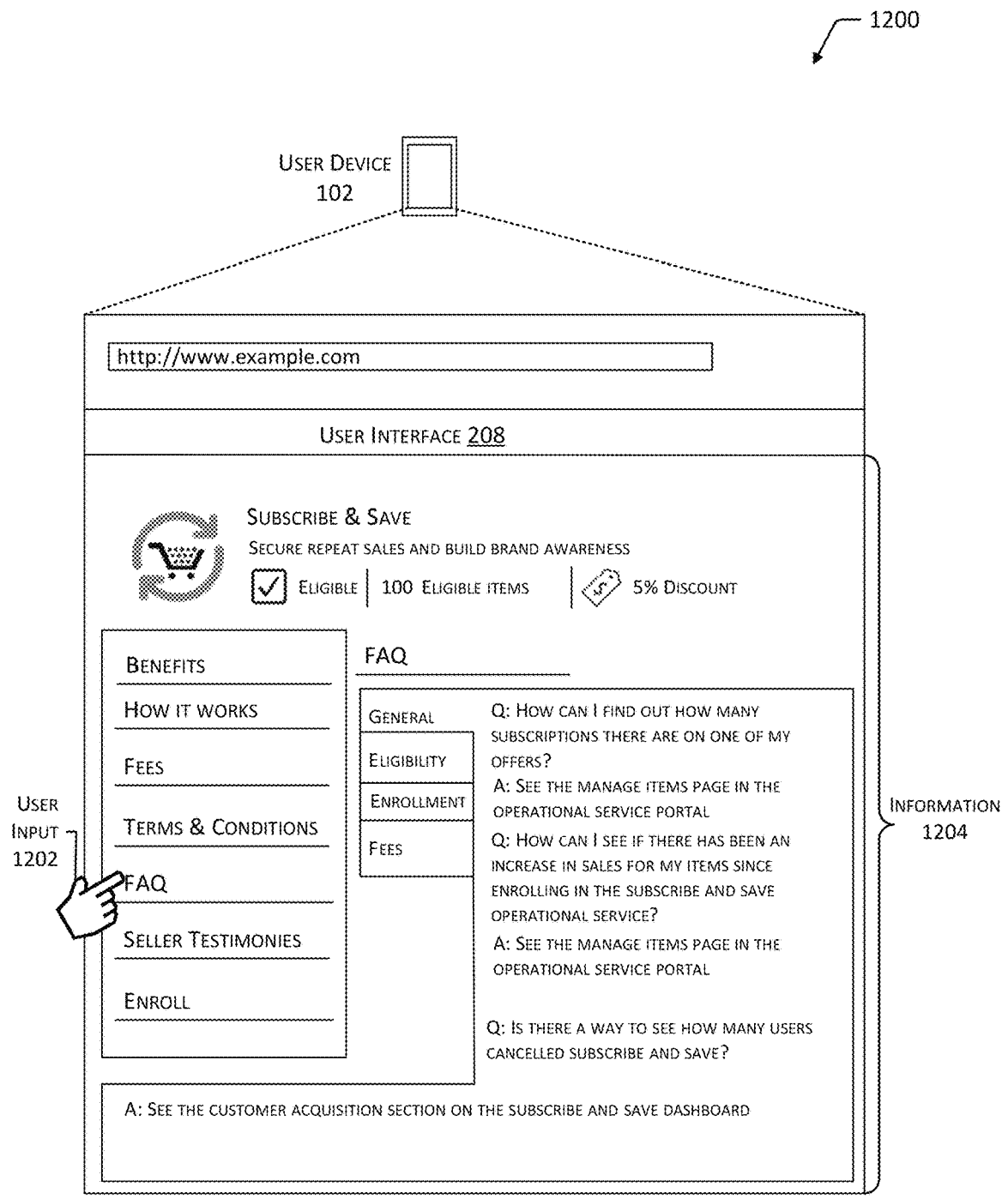
FIG. 12 is an example of a user interface that enables a seller partner to manage and view frequently asked question information about an operational service, according to one implementation.

FIG. 12 is an example 1200 of a user interface 208 that enables a seller partner 202 to manage and view frequently asked question information about an operational service 204, according to one implementation. The example 1200 may include the user device 102. The user device 102 may include the user interface 208. The user interface 208 may be configured to present the FAQs associated with the operational service 204. For example, the user interface 208 may present the FAQs associated with the subscribe and save operational service based on user input 1202. The user interface 208 may present information 1204. The information 1204 may include the operational service image 404, the operational service 406, the eligibility status 408, the operational service description 410, and so forth as described above. The location and the presentation of the information 1204 may correspond to the locations and presentations described above.

The information 1204 may also include the FAQs associated with the operational service 204. The FAQ section may include one or more questions specific to the operational service 204. For example, the questions may include "how can I find out how many subscriptions there are on one of my offers?", "how can I see if there has been an increase in sales for my items since enrolling in the subscribe and save operational service?", "is there a way to see how many users cancelled subscribe and save?", and so forth. The FAQ section may include an answer corresponding to each of the questions. The answer may directly answer the question or direct the seller partner 202 to where the answer to the question may be found. For example, the answer to the question "how can I find out how many subscriptions there are on one of my offers?" may be "see the manage items page in the operational service portal." In one implementation, the FAQ section may default to questions about operational services 204 in general. In other implementations, the FAQ section may default to questions specific to a particular operational service 204. For example, the FAQ section may default to questions specific to the subscribe and save operational service when the seller partner 202 is viewing the service. The selection of different sections, menu tabs 304, filters, and so forth, may cause the user device 102 to have the user interface 208 present FAQ's relevant to that selection.

The presentation of the FAQ section associated with the operational service 204 may be an overlay on the operational service portal 302 or the home page associated with the operational service 204. For example, the user device 102 may receive the user input 1202 selecting the FAQ section. The user device 102 may, rather than opening a new page, cause the user interface 208 to present the FAQ section as an overlay over the subscribe and save operational service page. By providing an overlay the seller partner 202 may be able to reduce the need to scroll around and switch views many times to find the right data or functionality. In other implementations, the user device 102 may cause the user interface 208 to present the page associated with the FAQ section as a new page.

Figure 13:
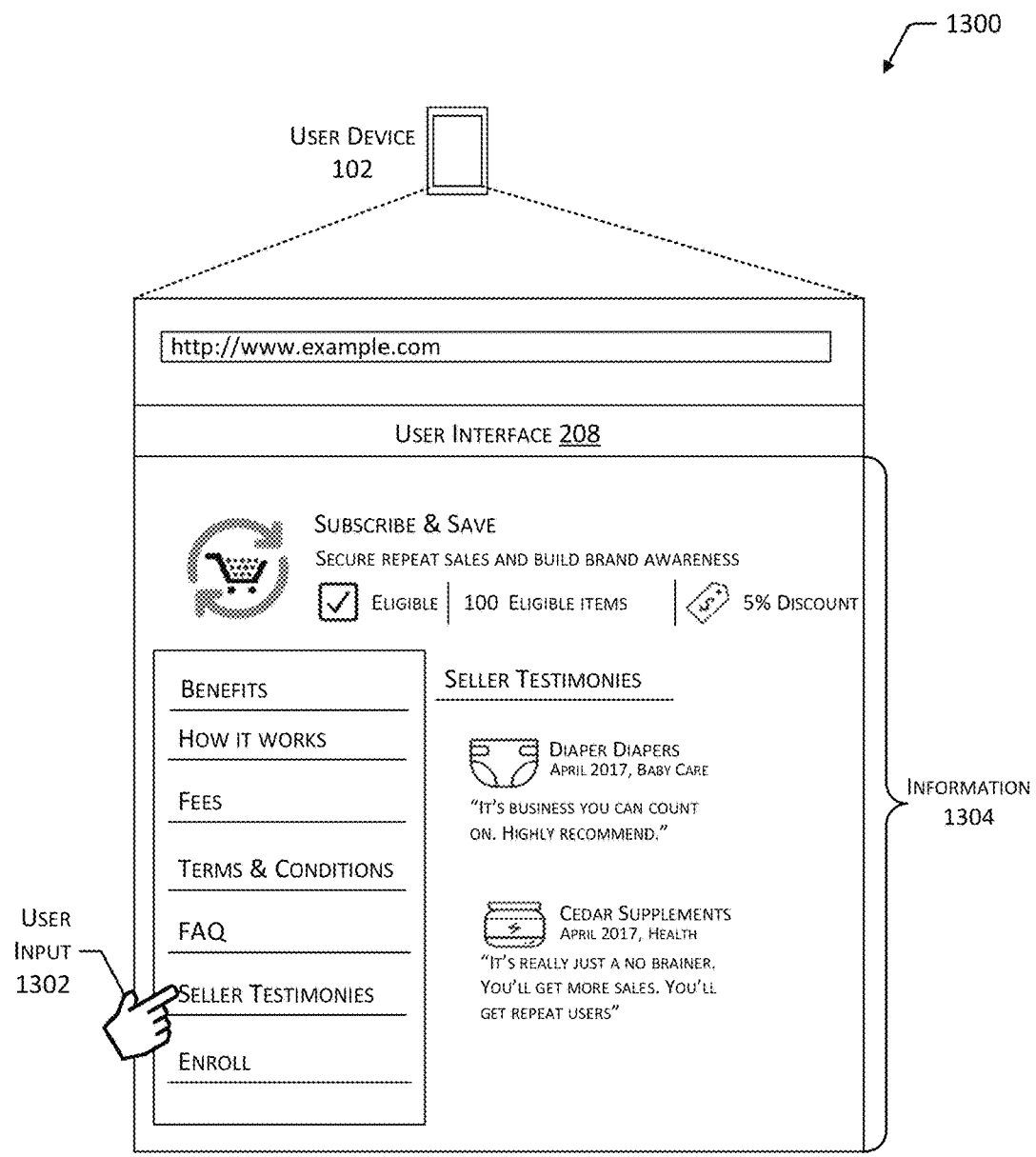
FIG. 13 is an example of a user interface that enables a seller partner to manage and view testimony information about an operational service, according to one implementation.

FIG. 13 is an example 1300 of a user interface 208 that enables a seller partner 202 to manage and view testimony information about an operational service 204, according to one implementation. The example 1300 may include the user device 102. The user device 102 may include the user interface 208. The user interface 208 may be configured to present the seller testimonies associated with the operational service 204. For example, the user interface 208 may present the seller testimonies associated with the subscribe and save operational service based on user input 1302. The user interface 208 may present information 1304. The information 1304 may include the operational service image 404, the operational service 406, the eligibility status 408, the operational service description 410, and so forth as described above. The location and the presentation of the information 1304 may correspond to the locations and presentations described above.

The information 1304 may include the top three (3) to four (4) seller testimonials. Each of the seller testimonials may include a company name, a date of when the testimonial was provided, item category, key portion of the testimonial highlighted in bolded color font, such as an orange bolded color, and the testimonial outlined proximately below the key portion. The seller testimony may include an image. The image may be of the item sold by the seller partner 202.

The presentation of the seller testimonies section associated with the operational service 204 may be an overlay on the operational service portal 302 or the home page associated with the operational service 204. For example, the user device 102 may receive the user input 1302 selecting the seller testimonies section. The user device 102 may, rather than opening a new page, cause the user interface 208 to present the seller testimonies section as an overlay over the subscribe and save operational service page. By providing an overlay the seller partner 202 may be able to reduce the need to scroll around and switch views many times to find the right data or functionality. In other implementations, the user device 102 may cause the user interface 208 to present the page associated with the seller testimonies section as a new page.

Figure 14:
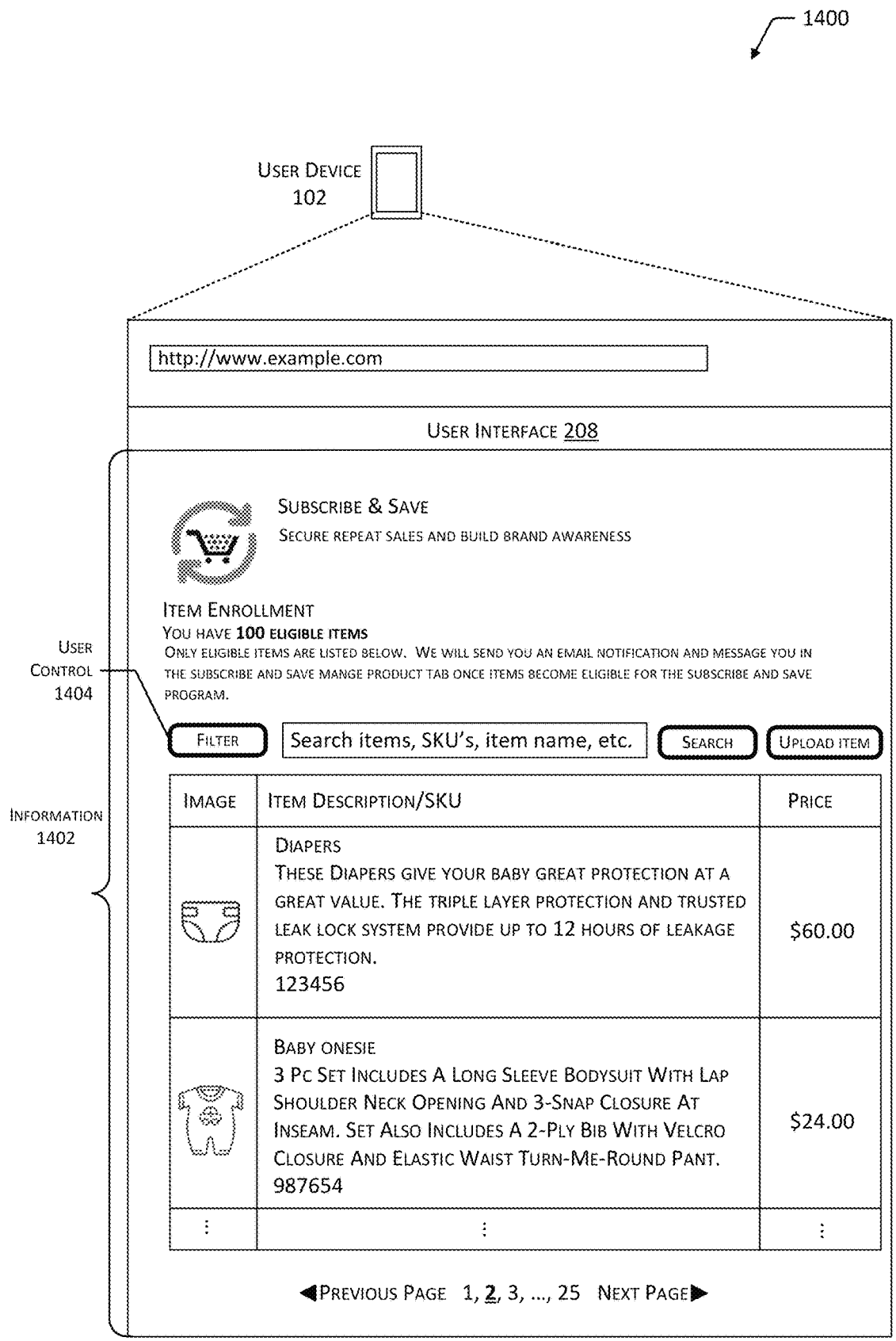
FIG. 14 is an example of a user interface that enables a seller partner to manage and view item management and performance, according to one implementation.

FIG. 14 is an example 1400 of a user interface 208 that enables a seller partner 202 to manage and view item management and performance, according to one implementation. The example 1400 may include the user device 102. The user device 102 may include the user interface 208. The user interface 208 may be configured to present information 1402 associated with an item enrollment page of the operational service 204. The information 1402 may include a user control 1404, number of items eligible to be enrolled, program specific success metrics, paths to enroll items, ability to omit presentation of recommended items from item enrollment, search field, a list of items eligible to enroll, and so forth.

The user control 1404 enables the seller partner 202 to filter the list of eligible items available to enroll, enroll items, omit the presentation of recommended items, and so forth. In other implementations, the user control 1404 may enable the seller partner 202 to search for particular items, such as by stock keeping unit, keywords, the item's name or description, and so forth. The user control 1404 may also enable the seller partner 202 to enroll items individually or as a group of items.

The number of items eligible to be enrolled may be presented proximately below the operational service. For example, the operational service 204 may be subscribe and save and item enrollment may be proximately below that and may be an indication that the seller partner 202 has one hundred (100) eligible items to be enrolled in the service. Proximately below the number of items eligible may be a notification from the store. The notification may indicate the "only eligible items are listed below. We will send you an email notification and message you in the subscribe and save manage product tab once items become eligible for the subscribe and save program." By providing the notification the seller partner 202 may know that the items listed below are eligible and may be able to make a decision whether to enroll in the operational service 204 or enroll the individual items in the operational service 204.

The list of items may include an image of the item, item description, price, and so forth. For example, the seller partner 202 may have diapers that are eligible. The image may be a diaper and the item description may include that "These diapers give your baby great protection at a great value. The triple layer protection and trusted leak lock system provide up to 12 hours of leakage protection." The item description may also include an SKU such as 123456. The price associated with the diapers may be $60.00. From the list of eligible items, the seller partner 202 may select an individual item, a group or portion of items, or all the items to be uploaded. The user interface 208 may present a user control that enables the seller partner 202 to select the items desired to be uploaded and participate in the operational service 204.

The user interface 208 may include a pagination control located below the information 1402. The pagination control may be an ordinal numbering of pages or may also indicate the total number of items. For example, the pagination control may indicate that the seller partner 202 is viewing page 2 of 25 pages. In another example, the pagination control may indicate that there are four hundred and fifty (450) items.

The presentation of the user interface 208 that enables the seller partner 202 to manage and view item management and performance may be an overlay on the operational service portal 302 or the home page associated with the operational service 204. By providing an overlay the seller partner 202 may be able to reduce the need to scroll around and switch views many times to find the right data or functionality. In other implementations, the user device 102 may cause the user interface 208 to present the page that enables the seller partner 202 to manage and view item management and performance as a new page.

Figure 15:
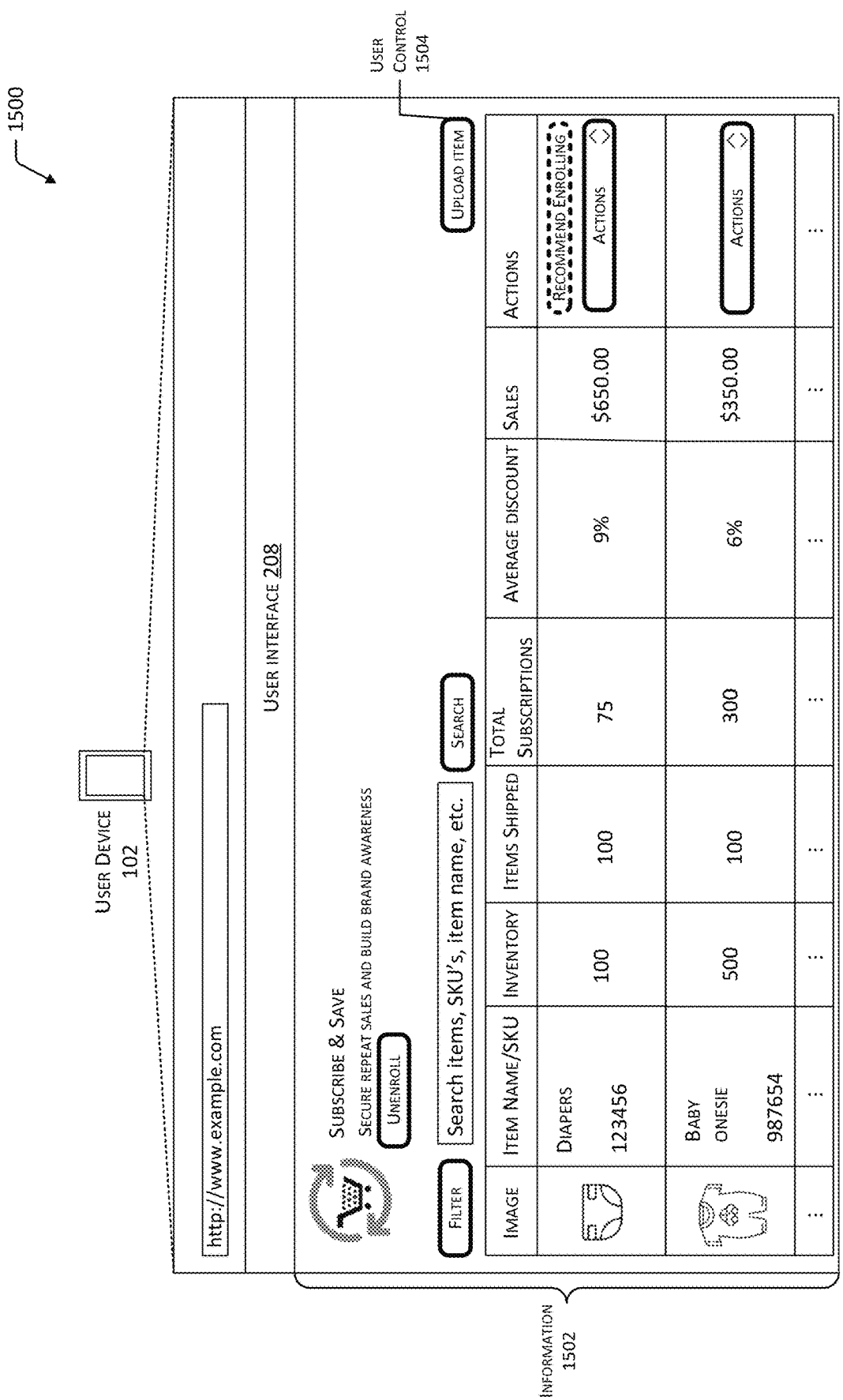
FIG. 15 is an example of is an example of a user interface that enables a seller partner to manage and view item management and performance, according to another implementation.

FIG. 15 is an example 1500 of a user interface 208 that enables a seller partner 202 to manage and view item management and performance, according to another implementation. The example 1500 may include the user device 102. The user device 102 may include the user interface 208. The user interface 208 may be configured to present a single destination in which items are or may be enrolled in a particular operational service 204. For example, the seller partner 202 may be enrolled in the subscribe and save operational service. The user interface 208 may present a user control configured to enable the seller partner 202 to unenroll in the particular operational service 204. For example, the user interface 208 may present a user control that enables the seller partner 202 to unenroll from the subscribe and save operational service. The unenroll user control may be located below the title of the operational service 204.

The user interface 208 may present information 1502. The information 1502 may include a list of items currently enrolled. The list of items may be presented in a table format with headers that include an image, item name/SKU, inventory, items shipped, total subscriptions, average discount, sales, actions, and so forth. For example, the seller partner 202 may have enrolled diapers in the subscribe and save operational service. The user interface 208 may present an image of the diaper, the item name diapers and an SKU of 123456, inventory of 100 diapers, items shipped of 100, total subscriptions of 75 users, average discount of 9%, and sales of $650.00.

In another implementation, the information 1502 may include a list of items that may be enrolled in the particular operational service 204. For example, the seller partner 202 may be enrolled in the subscribe and save operational service. The list of items presented may be items that are eligible to be enrolled. The list of items may include a recommendation notification for one or more of the items. For example, the list of items may include baby items, such as diapers and baby clothes. The diapers may have a recommendation notification that this particular item would benefit the seller partner 202 to be enrolled in the subscribe and save operational service.

In other implementations, the seller partner 202 may select one or more of the items included in the information 1502 and select to have those items upload and enroll to a particular operational service 204. For example, the seller partner 202 may select thirty-five (35) of the one hundred (100) eligible items to be enrolled in the subscribe and save operational service.

By presenting a single destination user interface 208 to manage and view item management and performance aids in the seller partner's decision making by surfacing alerts such as low inventory, inventory less than forecasted, out of stock, price violation, at risk of long-term storage fees (LTSF), at risk of auto-removal, and so forth. The alerts may have a default action recommendation tied to them. For example, for low inventory alerts the default action recommendation may to replenish the inventory. The seller partner 202 may be able to replenish the inventory through the use of the user control 1504 located proximately beneath the action header. The seller partner 202 may also be enabled to add more items from this page. This action may reuse the same template or page as described in FIG. 14. The information 1502 may include a filter user control and search user control, as described above.

Figure 16:
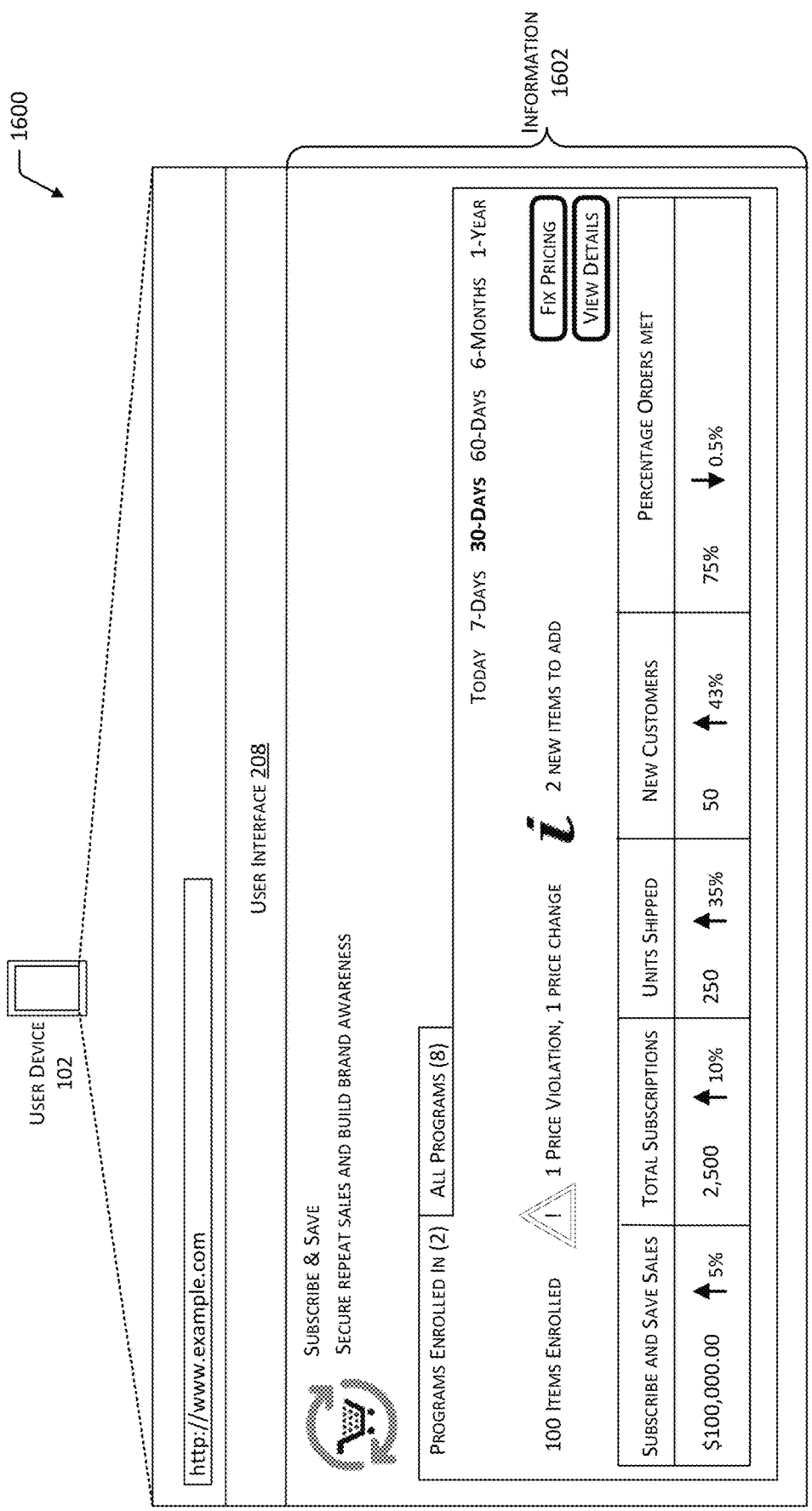
FIG. 16 is an example of a user interface that enables a seller partner to manage and view item management and performance, according to another implementation.

FIG. 16 is an example 1600 of a user interface 208 that enables a seller partner 202 to manage and view item management and performance, according to another implementation. The example 1600 may include the user device 102. The user device 102 may include the user interface 208. The user interface 208 may be configured to present information 1602. The information 1602 may include the operational service image 404, operational service 406, operational service description 410, indication of a duration of how long the seller partner 202 has been a member of that particular operational service, and so forth. For example, the user interface 208 may present the operational service image 404 associated with the subscribe and save operational service and the operational service description 410 may include secure repeat sales and build brand awareness.

The information 1602 may include one or more operational service metrics or business relevant indicators, such as top key performance indicators (KPI). The KPI's may be operational service 204 specific and may include trends based on a timeline selection, such as today, 7 days, 30 days, 90 days, 6 months, 1 year, and so forth. The user interface 208 may display an upward pointing arrow for upward trends or a downward pointing arrow for downward trends based on the timeline selection. The information 1602 may include an overview card that include the one or more KPI's. For example, the information 1602 may include subscribe and save sales KPI, total subscriptions KPI, units shipped KPI, new customers KPI, percentage orders met KPI, and so forth. Proximate to each KPI may be the arrow indicating the trend for that particular KPI. In one implementation, the arrow may include a color. For example, the arrow may be green when the arrow is pointing upward and red when the arrow is pointing downward.

The information 1602 may include a first performance element that presents a purchase rate. The purchase rate may be for one or more items associated with a particular operational service 204 that the seller partner 202 is enrolled in. The purchase rate may indicate how often a particular item is purchased. For example, the purchase rate may indicate that diapers have had $100,000 in sales for the subscribe and save operational service in the past thirty (30) days. The information 1602 may include a second performance element that presents a cancellation rate of user subscription to the particular operational service 204 that the seller partner 202 is enrolled in. For example, the second performance element may indicate a cancellation rate of sixty (60) days after a customer subscribes they cancel their subscription. The information 1602 may include a third performance element that presents a return rate for one or more items associated with the particular operational services 204 that the seller partner 202 is enrolled in. For example, the third performance element may indicate that the customer may have a return rate of 35% for a particular item.

The information 1602 may include a list of the number of items enrolled in the operational service 204, an indication of an issue associated with one or more of the items, price changes associated with individual items, a number of recently added items and so forth. For example, as illustrated in FIG. 16 the seller partner 202 may have one hundred (100) items enrolled in the subscribe and save operational service, a price violation associated with a particular item, a price change associated with a particular item, two (2) items recently added, and so forth. The information 1602 may include user controls. The user controls may enable the seller partner 202 to view further details, fix pricing issues, and so forth. For example, the user device 102 may receive a user input selecting the "Fix Pricing" user control. The selection of the user control may resolve the pricing violation.

In one implementation, the user control represented as "Fix Pricing" may be a main call to action button that is associated with the urgent alerts. As illustrated, in FIG. 16 the main call to action button is tied to the fix pricing issue. In this implementation, the information 1602 may include a secondary call to action button. The secondary call to action button may be represented as "view details." The view details user control may navigate the seller partner 202 to the operational service portal 302. When there are no urgent alerts the user interface 208 may omit presentation of the secondary call to action and present the main call to action button associated with "view details."

By presenting the user interface 208 to manage and view item management and performance aids in the seller partner's 202 decision making by surfacing alerts such as low inventory, inventory less than forecasted, out of stock, price violation, at risk of long-term storage fees (LTSF), at risk of auto-removal, and so forth. The alerts may have a default action recommendation tied to them. For example, for price violation alerts the default action recommendation may be to change the price.

Figure 17:
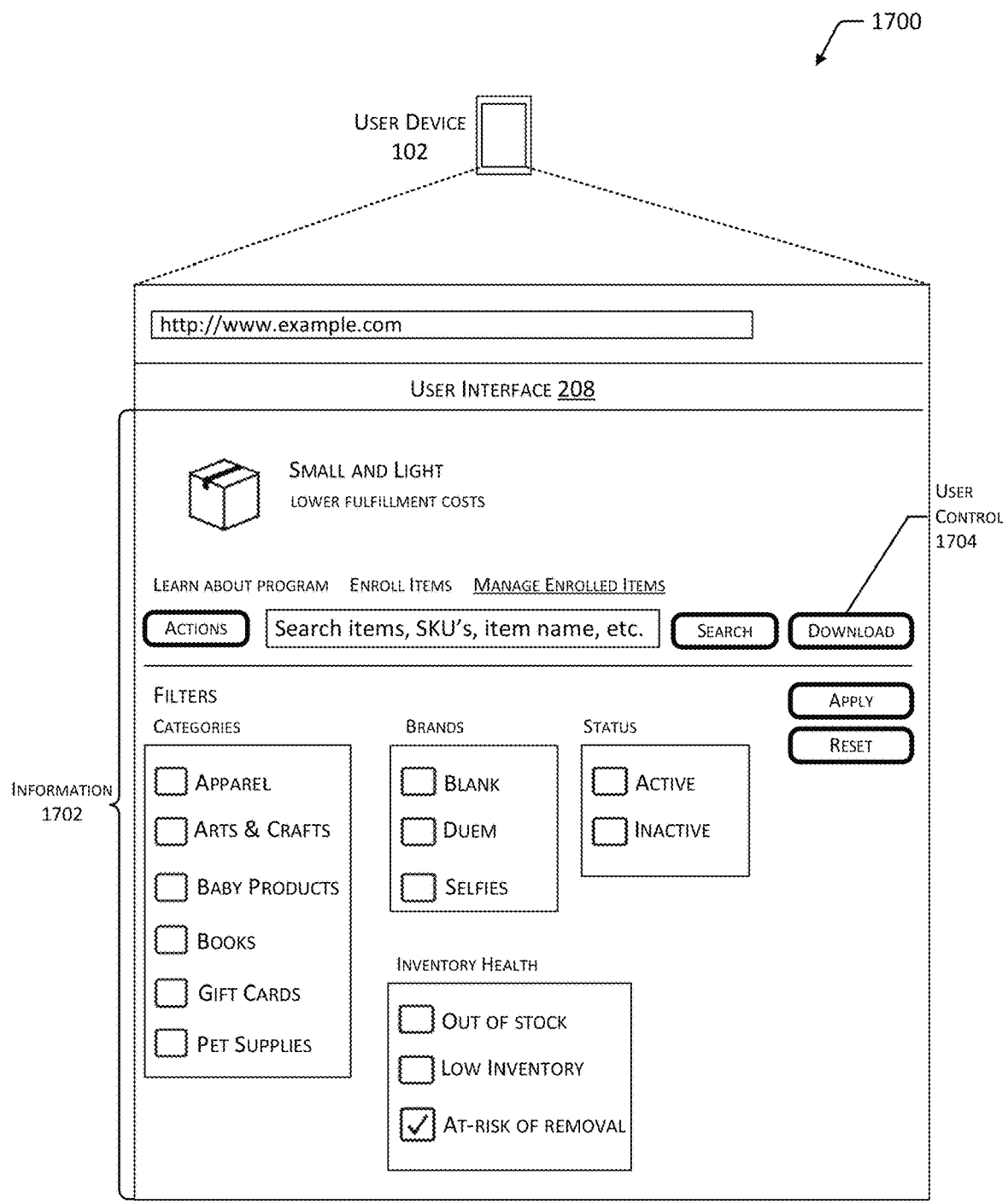
FIG. 17 is an example of a user interface that enables a seller partner to manage one or more filters, according to one implementation.

FIG. 17 is an example 1700 of a user interface 208 that enables a seller partner 202 to manage one or more filters, according to another implementation. The example 1700 may include the user device 102. The user device 102 may include the user interface 208. The user interface 208 may be configured to present information 1702. The information 1702 may include the operational service image 404, operational service 406, operational service description 410, and so forth. For example, the user interface 208 may present the operational service image 404 associated with the small and light operational service and the operational service description 410 may include lower fulfillment cost.

The information 1702 may include one or more filters, user controls 1704, and so forth. The filters may be categorized into one or more groups. For example, the filters may be categorized into a category group, brand group, status group, inventory health group, and so forth. The category group may include a list of filters and user controls 1704 to select. The list of filters may include apparel, arts and crafts, baby products, books, gift cards, pet supplies, and so forth. Proximate to each of the filters in the list may be a user control 1704. The brand group may include filters that enable the seller partner 202 to filter based on particular brands. For example, the brand group may include "Blank," "Duem," "Selfies," and so forth. The status group may include filter options to filter items that are "active," "inactive," and so forth. The inventory health group may include "out of stock filter," "low inventory filter," "at-risk of removal filter," and so forth. When the seller partner 202 selects one or more filters, the seller partner 202 may select the "Apply" user control 1704 to cause the user device 102 to load and the user interface 208 to present filtered content. When the "Apply" user control 1704 is selected the filters may collapse or be omitted from being presented. The "Reset" user control 1704 may enable the seller partner 202 to reset the filters. The "Reset" user control 1704 removes previous selections of the one or more filters.

Figure 18:
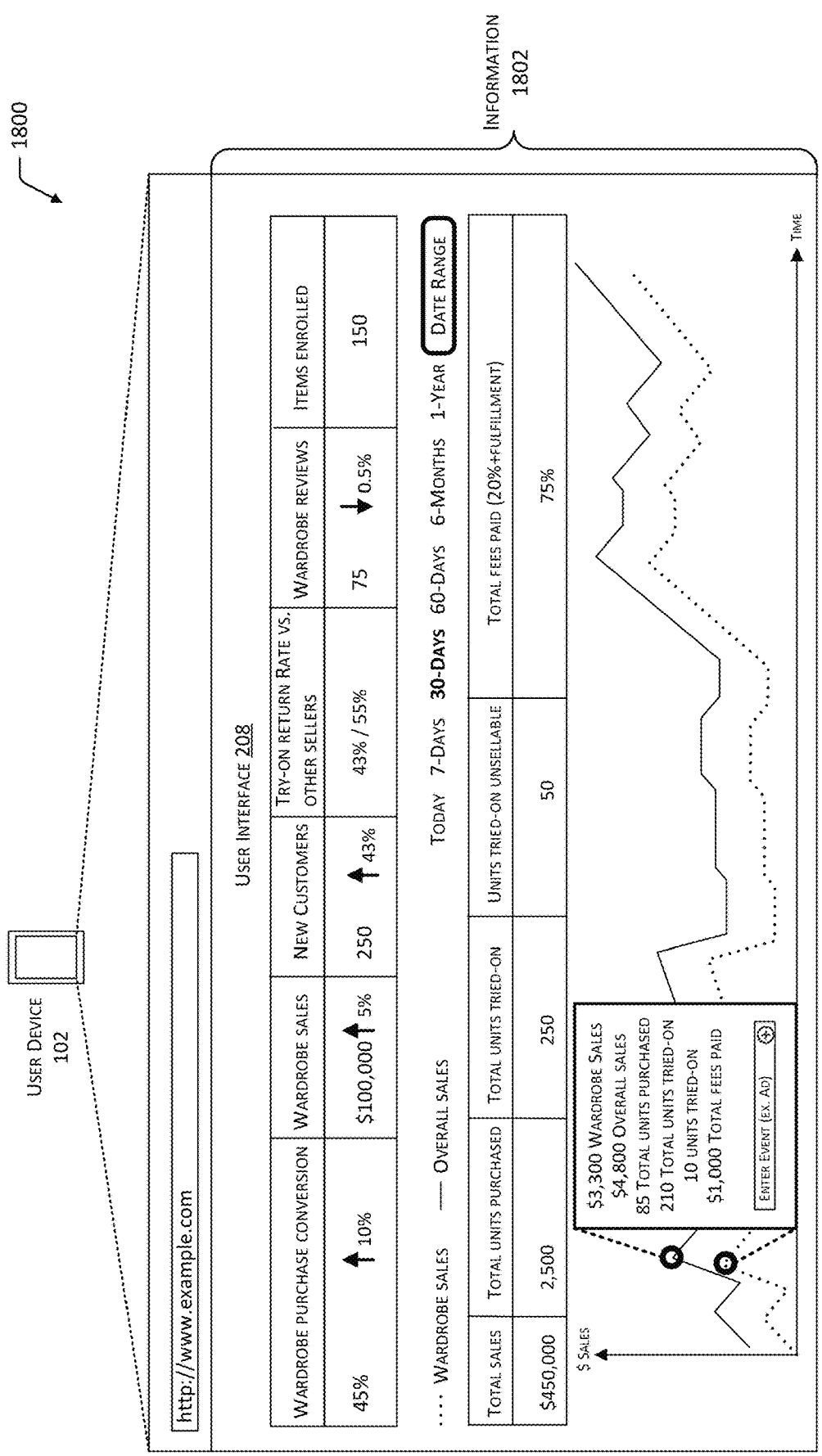
FIG. 18 is an example of a user interface that enables a seller partner to manage and view item management and performance, according to another implementation.

FIG. 18 is an example 1800 of a user interface 208 that enables a seller partner 202 to manage and view item management and performance, according to another implementation. The example 1800 may include the user device 102. The user device 102 may include the user interface 208. The user interface 208 may be configured to present information 1802. The information 1802 may include the operational service image 404, operational service 406, operational service description 410, indication of a duration of how long the seller partner 202 has been a member of that particular operational service, and so forth. For example, the user interface 208 may present the operational service image 404 associated with the subscribe and save operational service and the operational service description 410 may include secure repeat sales and build brand awareness.

The information 1802 may include top key performance indicators (KPI). The KPI's may be operational service 204 specific. The user interface 208 may display an upward pointing arrow for upward trends or a downward pointing arrow for downward trends based on the timeline selection. The information 1802 may include an overview card that includes the one or more KPI's. For example, the information 1802 may include wardrobe purchase conversion KPI, wardrobe sales KPI, new customers KPI, try-on return rate vs. other sellers KPI, wardrobe reviews KPI, items enrolled KPI, and so forth. Proximate to each KPI may be the arrow indicating the trend for that particular KPI. In one implementation, the arrow may include a color. For example, the arrow may be green when the arrow is pointing upward and red when the arrow is pointing downward.

The information 1802 provides the seller partner 202 an overview of the performance of their items within the operational service 204. The user interface 208 may include a user control that enables the seller partner 202 to download one or more reports, an overview of the top KPI's, as described above, and so forth. The information 1802 may also include a graph based on one or more KPI's. The KPI's may be operational service 204 specific and may include trends based on a timeline selection, such as today, 7 days, 30 days, 60 days, 6 months, 12 months, and so forth. As illustrated, the user interface 208 may present a graph based on the timeline selection of 30 days depicting the wardrobe sales and the overall sales for the seller partner 202. The user interface 208 may present information based on the seller partner 202 selecting a point on the graph. For example, the user interface 208 may present that the seller partner 202 has had $3,300 Wardrobe Sales, $4,800 Overall sales, 85 Total units purchased, 210 Total units tried-on, 10 units tried-on, $1,000 Total fees paid, and so forth.

In other implementations, the information 1802 may include the one or more performance metrics, as described above. The one or more performance metrics may include a first performance element that presents a purchase rate. The purchase rate may be for one or more items associated with the one or more operational services 204 of the seller partner 202. The purchase rate may indicate how often a particular item is purchased. For example, the purchase rate may indicate wardrobe sales. The wardrobe sales may indicate that the seller partner 202 has had $100,000 in sales. In another example, the purchase rate may indicate that diapers tend to be purchased by a particular user every thirty (30) days. The one or more performance metrics may include a second performance element that presents a cancellation rate of user subscription to one or more operational services 204 associated with the seller partner 202. For example, the second performance element may indicate a cancellation rate of ninety (90) days for subscribing to the wardrobe operational service. In another example, the second performance element may indicate a cancellation rate of sixty (60) days after a customer subscribes they cancel their subscription. The one or more performance metrics may include a third performance elements that presents a return rate for one or more items associated with the one or more operational services 204 of the seller partner 202. For example, the third performance element may indicate that the customer may have a return rate of 43% for a particular item.

By presenting the user interface 208 to manage and view item management and performance aids in the seller partner's decision making by presenting key performance metrics and indicators along with trends. This information gives the seller partner 202 a better understanding of how the operational service 204 is benefiting them, such as sales, reviews, customer acquisition, return on investment, and so forth.

Figure 19:
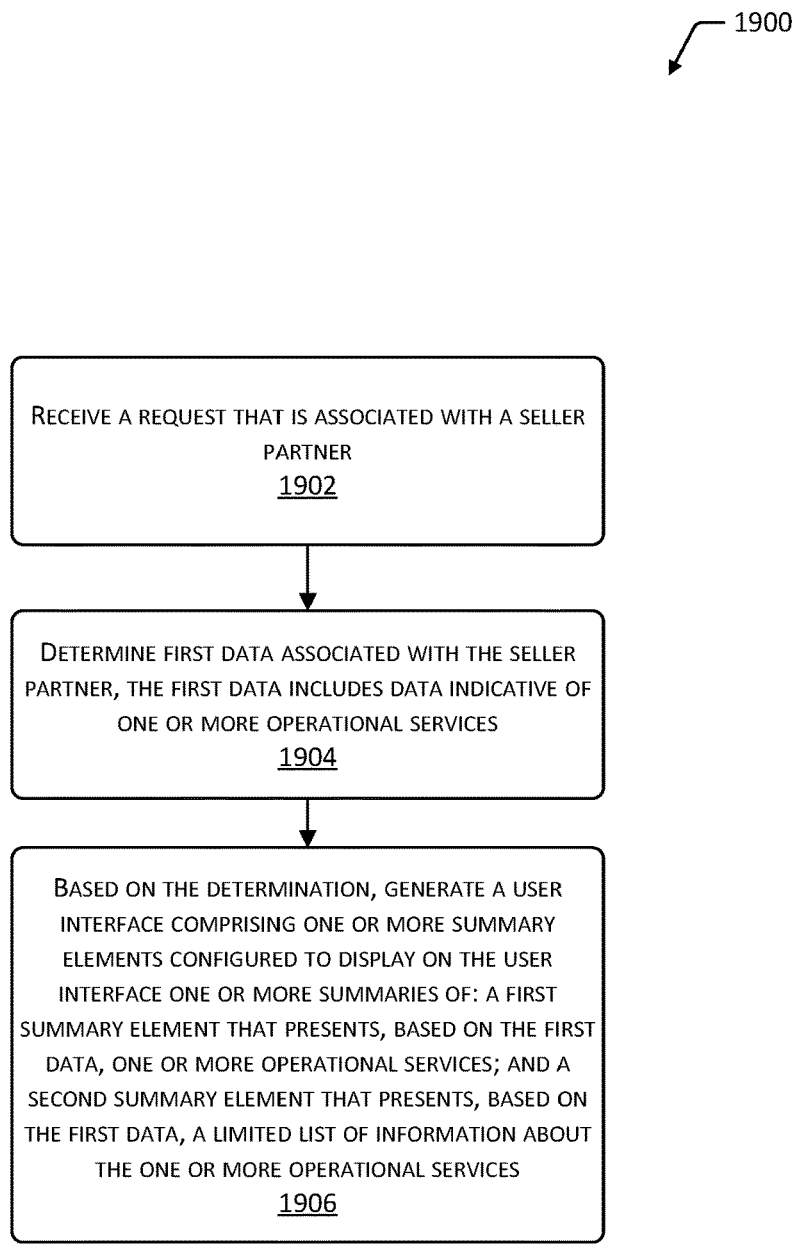
FIG. 19 depicts a flow diagram for generating a user interface that enables seller partners to view one or more summary elements, according to one implementation.

FIG. 19 depicts a flow diagram for generating a user interface that enables seller partners to view one or more summary elements 310, according to one implementation. Although the process 1900 is described with reference to the flowchart illustrated in FIG. 19, many other methods for performing the acts associated with the process 1900 may be used. For example, the order of the steps may be changed, some of the steps described may be optional, and additional steps may be included.

At 1902, the user device 102 may receive a request that is associated with a seller partner 202. For example, the user device 102 may include a display device configured to present the user interface 208 that includes one or more summary elements 310 that can be reached directly from a menu tab 304. The user device 102 may include at least one memory storing computer-executable instructions and at least one processor in communication with the at least one memory. The at least one processor executes the computer-executable instructions to receive the request that is associated with the seller partner 202, as described above.

At 1904, the user device 102 may determine first data or the seller data associated with the seller partner 202. The first data may include data indicative of one or more operational services 204. For example, the seller data may include the precomputed data 246 and the operational service seller partner item eligibility data 250. The precomputed data 246 may include operational service seller partner eligibility data 248, operational service seller partner item eligibility data 250, and so forth. For example, the eligibility service 230 may generate the precomputed data 246. The operational service seller partner eligibility data 248 may comprise information indicative of whether particular seller partners 202 are eligible for particular operational services 204. The operational service seller partner item eligibility data 250 may comprise information indicative of whether particular items offered by a particular seller partner 202 are eligible for particular operational services 204. The precomputed data 246 may be updated dynamically, responsive to an event, on demand, or according to a specified schedule.

At 1906, the user device 102 based on the determination may generate the user interface 208 to include the one or more summary elements 310 configured to display on the user interface 208 one or more summaries of: a first summary element 310 that presents, based on the seller partner data, one or more operational services, and a second summary element 310 that presents, based on the first data, a limited list of information about the one or more operational services 204. For example, the user interface 208 may present the one or more summary elements 310, as described above.

Figure 20:
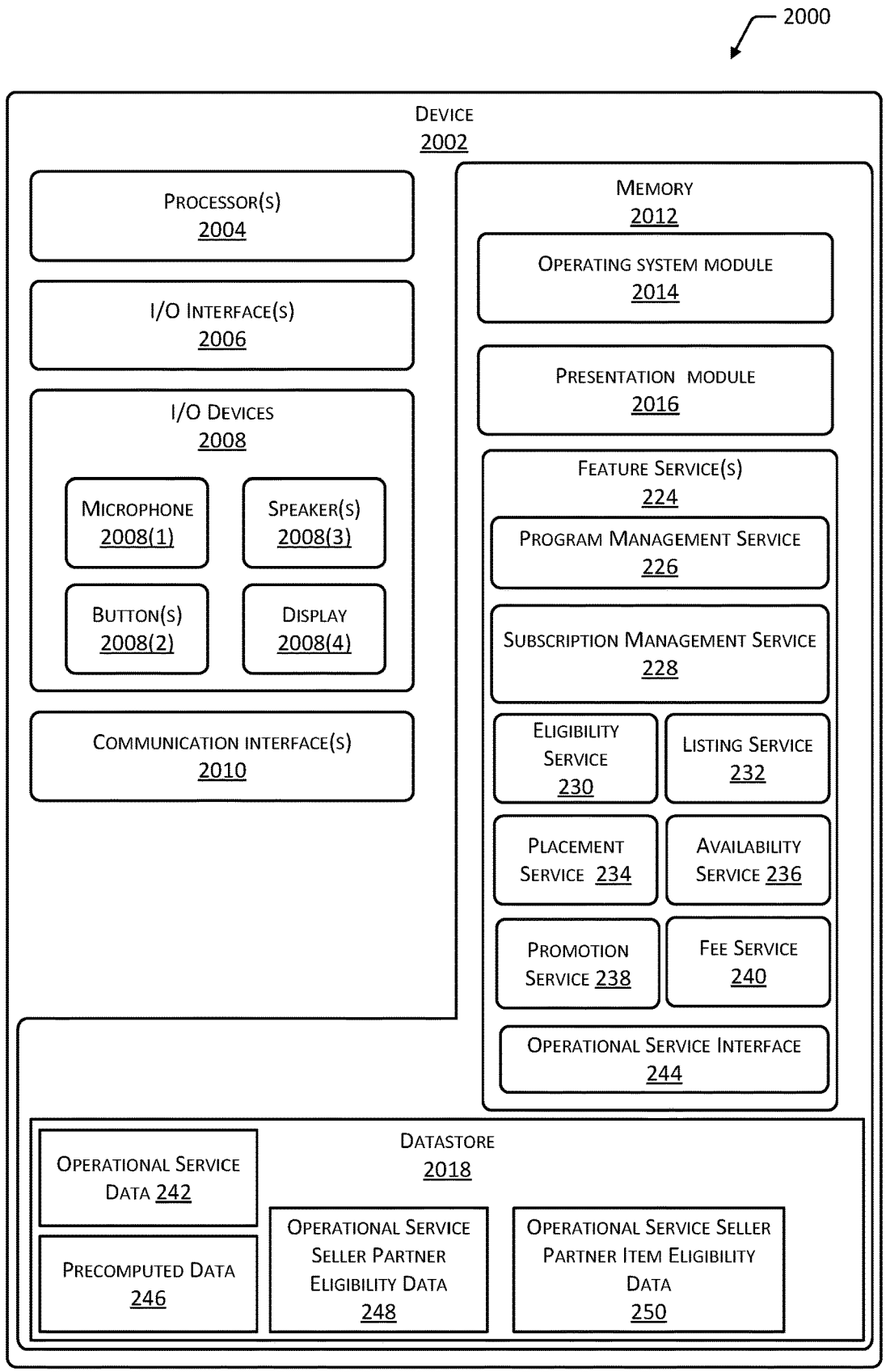
FIG. 20 illustrates a block diagram of a device to generate and display a user interface that enables seller partners to view one or more summary elements, according to one implementation.

FIG. 20 illustrates a block diagram 2000 of a device 2002 to generate and display a user interface 208 that enables seller partners 202 to view one or more summary elements 310, according to one implementation. The device 2002 may be the user device 102, the computing device 212, or a combination thereof. The device 2002 is illustrative and non-limiting, and may be a desktop computer, a tablet computer, a server, a wearable computer, an e-book reader, a media device, a cellular phone, a laptop computer, or another suitable apparatus. The device 2002 may include one or more processors 2004 configured to execute one or more stored instructions. The processor(s) 2004 may comprise one or more cores and may also be referred to as hardware processors.

The device 2002 may include one or more input/output (I/O) interface(s) 2006 to allow the processor(s) 2004 or other components of the device 2002 to communicate with various other devices 2002, other computing devices, the user device 102, the computing device 212, other services, and so on. The I/O interfaces 2006 may include interfaces such as Inter-Integrated Circuit (I2C), Serial Peripheral Interface bus (SPI), Universal Serial Bus (USB) as promulgated by the USB Implementers Forum, RS-234, and so forth.

The I/O interface(s) 2006 may couple to one or more I/O devices 2008. The I/O devices 2008 may include one or more input devices such as a keyboard, a mouse, a microphone 2008(1), user input buttons 2008(2), and so forth. The I/O devices 2008 may also include output devices such as audio speakers 2008(3), one or more displays 2008(4), and so forth. In some embodiments, the I/O devices 2008 may be physically incorporated within the device 2002, or they may be externally placed. The I/O devices 2008 may include various other devices as well.

The device 2002 may also include one or more communication interfaces 2010. The communication interface(s) 2010 are configured to provide communications with other devices, web-based resources, the user device 102, the computing devices 212, other services, routers, wireless access points, and so forth. The communication interfaces 2010 may include wireless functions, devices configured to couple to one or more networks including local area networks (LANs), wireless LANs, wide area networks (WANs), and so forth. The device 2002 may also include one or more buses or other internal communications hardware or software that allow for the transfer of data between the various modules and components of the device 2002.

The device 2002 includes one or more memories 2012. The memory 2012 comprises one or more computer-readable storage media (CRSM). The memory 2012 provides storage of computer readable instructions, which enables the user device 102, to present the user interface 104, 208, the operational service portal 302, user interfaces associated with an application, data structures, program modules, and other data used during the operation of the user device 102, the computing device 212, and so forth. The memory 2012 may include at least one operating system (OS) module 2014. Respective OS modules 2014 are configured to manage hardware devices such as the I/O interface(s) 2006, the I/O devices 2008, the communication interface(s) 2010, and provide various services to applications or modules executing on the processors 2004.

Also, stored in the memory 2012 may be one or more of the following modules. These modules may be executed as foreground applications, background tasks, daemons, and so forth. A presentation module 2016 may be configured to present the user interface 104, 208, user controls 308, 506, 1006, 1404, 1504, 1704, the user interface associated with an application, and so forth. For example, the presentation module 2016 may comprise a web browser.

The memory 2012 may also include the feature services 224. The feature services 224 may include a program management service 226, a subscription management service 228, and so forth. The program management service 226 may manage data interchange between the user interface elements 214 and one or more feature services 224. The subscription management service 228 may be used to control which feature services 224 the user interface elements 214 are permitted to exchange information with via the program management service 226.

In other implementations, the feature services 224 may provide various functionality of particular operational services 204 or portions thereof. An eligibility service 230 may be used to determine if a particular seller partner 202, item, or combination thereof, is eligible for a particular operational service 204. A listing service 232 may provide information such as those operational services 204 that are being presented as available for use. A placement service 234 may provide information as to how one or more user interface elements 214 may be arranged in the user interface 104, 208, such as by ranking in order of relevance to the seller partner 202. An availability service 236 may provide information about the current status of a particular operational service 204, performance of the operational service 204, and so forth.

The memory 2012 may also include the promotion service 238. The promotion service 238 may be configured to implement a promotion strategy in which one or more operational services 204 or features thereof are presented to one or more seller partners 202 at various points within the user interface 104, 208, as described above.

The memory 2012 may include the fee service 240, as described above. The fee service 240 may provide information about fees that are associated with an operational service 204.

The memory 2012 may include the operational service interface 244, as described above. The operational service interface 244 may coordinate the exchange of information with these operational services 204.

The memory 2012 may also include a datastore 2018 to store information. The datastore 2018 may use a flat file, database, linked list, tree, executable code, or other data structure to store the information. In some implementations, the datastore 2018 or a portion thereof may be distributed across one or more of the user device 102, the computing device 212, and so forth.

The datastore 2018 may store the operational service data 242, the precomputed data 246, the operational service seller partner eligibility data 248, the operational service seller partner item eligibility data 250, and so forth. The precomputed data 246 may include operational service seller partner eligibility data 248, operational service seller partner item eligibility data 250, and so forth. For example, the eligibility service 230 may generate the precomputed data 246. The operational service seller partner eligibility data 248 may comprise information indicative of whether particular seller partners 202 are eligible for particular operational services 204. The operational service seller partner item eligibility data 250 may comprise information indicative of whether particular items offered by a particular seller partner 202 are eligible for particular operational services 204. The precomputed data 246 may be updated dynamically, responsive to an event, on demand, or according to a specified schedule.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

What is claimed is:

1. A device comprising:
   at least one memory storing computer-executable instructions; and
   at least one processor in communication with the at least one memory, the at least one processor executes the computer-executable instructions to:
      receive a request that is associated with a seller partner;
      determine first data associated with the seller partner, the first data includes:
         first information indicative of one or more first operational services that the seller partner is currently enrolled in, and
         second information indicative of criteria to achieve eligibility for one or more second operational services that the seller partner is ineligible to enroll in; and
      generate a user interface comprising:
         a first element that presents, based on the first data, one or more of:
            the one or more first operational services that the seller partner is currently enrolled in, and
            a first limited list of information about the one or more first operational services that the seller partner is currently enrolled in; and
         a second element that presents, based on the first data, one or more of:
            the one or more second operational services that the seller partner is ineligible to enroll in, and
            a second limited list of information about the criteria for the seller partner to achieve eligibility for the one or more second operational services.

2. The device of claim 1, wherein:
   the first data further includes third information indicative of a number of items eligible to enroll in the one or more first operational services or the one or more second operational services; and
   the user interface further includes one or more of:
      title information associated with individual ones of the one or more first operational services or the one or more second operational services, the title information is located proximately top center of an individual element, or
      a third element that presents, based on the first data, a limited list of information about the number of items eligible to enroll or the number of items ineligible to enroll in the one or more first operational services or the one or more second operational services, wherein the third element is below the title information.

3. The device of claim 1, wherein the at least one processor further executes the computer-executable instructions to:
   determine that a number of items associated with the first data are eligible to enroll in the one or more first operational services or the one or more second operational services; and
   generate the user interface to actuate a change from a first user control to a second user control, wherein the first user control and the second user control perform different operations.

4. The device of claim 1, wherein the at least one processor further executes the computer-executable instructions to:
   generate the user interface to further include one or more of:
      first title information associated with individual ones of the one or more first operational services, the first title information is located proximately top center of an individual element,
      second title information associated with individual ones of the one or more second operational services, the second title information is located proximately top center of the individual element, or
      a navigation menu that includes one or more widgets, individual ones of the one or more widgets display information associated with an individual one of the one or more first operational services or the one or more second operational services, wherein the navigation menu is located proximately left to the individual element.

5. The device of claim 1, wherein the at least one processor further executes the computer-executable instructions to:
   receive a second request to provide a list of individual items associated with the seller partner; and
   generate the user interface to include the list of the individual items and individual user controls proximate to the individual items, wherein the individual user controls provide one or more user control options.

6. The device of claim 1, wherein the at least one processor further executes the computer-executable instructions to:
   generate the second element to further include a third limited list of information about the one or more second operational services.

7. The device of claim 1, wherein the at least one processor further executes the computer-executable instructions to:
   receive a second request for performance information associated with a particular operational service that the seller partner is enrolled in; and generate a second user interface comprising one or more of:
- a first performance element that presents a purchase rate for one or more items associated with the particular operational service,
- a second performance element that presents a cancellation rate of user subscription to the particular operational service, or
- a third performance element that presents a return rate for one or more items associated with the particular operational service.

8. The device of claim 1, wherein the at least one processor further executes the computer-executable instructions to:
- receive user input selecting one of the one or more first operational services or the one or more second operational services;
- access the first data that indicates a list of items associated with the seller partner; and
- generate a second user interface recommending one or more items from the list of items that are eligible to be enrolled in the selected one or more first operational services or the selected one or more second operational services.

9. The device of claim 1, wherein the generation of the user interface further comprises one or more of:
- title information associated with individual ones of the one or more first operational services or the one or more second operational services, the title information is located proximately top center of an individual element; and
- wherein the first element or the second element is proximately located below the title information.

10. The device of claim 1, wherein the generation of the user interface further comprises:
- a third element that presents one or more selectable filters to filter the one or more first operational services to correspond to one or more business relevant indicators.

11. The device of claim 1, wherein the at least one processor further executes the computer-executable instructions to:
- receive user input selecting one of the one or more second operational services to enroll in; and
- generate a second user interface comprising information indicating one or more operational service metrics and business relevant indicators.

12. A device comprising:
- at least one memory storing computer-executable instructions; and
- at least one processor in communication with the at least one memory, the at least one processor executes the computer-executable instructions to:
  - determine first data associated with a seller partner, the first data includes:
    - first information indicative of one or more first operational services that the seller partner is currently enrolled in, and
    - second information indicative of criteria for the seller partner to achieve eligibility for one or more second operational services that the seller partner is ineligible to enroll in; and
  - generate user interface data comprising:
    - based on the first data, a first element that presents:
      - the one or more first operational services that the seller partner is currently enrolled in; and
      - a first limited list of information about the one or more first operational services; and
    - based on the first data, a second element that presents:
      - the one or more second operational services that a user is ineligible to enroll in; and
      - a second limited list of information about the criteria for the seller partner to achieve eligibility for the one or more second operational services.

13. The device of claim 12, wherein the first data further comprises second data indicative of one or more attributes of previous activity associated with the seller partner.

14. The device of claim 12, wherein the first and second limited lists of information include one or more of:
- title information associated with the one or more first operational services and the one or more second operational services, wherein the title information is located proximately top center of an individual element,
- an element image visually describing individual ones of the one or more first operational services and the one or more second operational services, wherein the element image is located proximately left of the title information,
- recommendation information indicating benefits the seller partner would receive by enrolling in the individual ones of the one or more second operational services, wherein the recommendation information is located proximately below an eligibility status, or
- fee information indicating associated fees for enrolling in the individual ones of the one or more second operational services; and
- a third element that presents a third limited list of information that includes at least:
  - the eligibility status indicating that the seller partner is eligible for individual ones of one or more third operational services that are available for the seller partner to enroll in, wherein the eligibility status is located proximately below the title information and proximately right of the title information.

15. The device of claim 12, wherein the at least one processor further executes the computer-executable instructions to:
- generate the user interface data to include a navigation menu that includes one or more widgets, individual ones of the one or more widgets display information associated with an individual one of the one or more first operational services or the one or more second operational services, wherein the navigation menu is located proximately left to the first element or the second element.

16. A computer-implemented method comprising: determining first data associated with a seller partner, the first data indicative of one or more operational services and information associated with the one or more operational services; and generating user interface data comprising one or more of: based on the first data, a first element that presents: one or more first operational services that the seller partner is currently enrolled in; and a first limited list of information about the one or more first operational services that the seller partner is currently enrolled in; or based on the first data, a second element that presents: one or more second operational services that the seller partner is currently ineligible to enroll in; and a second limited list of information about criteria for the seller partner to achieve eligibility for the one or more second operational services.

17. The computer-implemented method of claim 16, wherein the second element further comprises: a third limited list of information about the one or more second operational services.

18. The computer-implemented method of claim 16, further comprising: receiving a request indicative of user input selecting one of the one or more first operational services; and generating a response that includes information comprising one or more of: second data comprising information indicative of a list of items associated with the selected one or more first operational services, or third data comprising information indicative of an operational service element that presents information for individual items included in the list of items.

19. The computer-implemented method of claim 16, further comprising: receiving a request indicative of user input selecting one of the one or more first operational services; accessing the first data that indicates a list of items associated with the seller partner; and generating a response that includes second data comprising information indicative of one or more recommendations of one or more items from a list of items that are eligible to be enrolled in the selected operational service.

20. The computer-implemented method of claim 16, further comprising: receiving a request indicative of a user input selecting one of the one or more first operational services; and generating a response that includes information comprising one or more of: a first data structure comprising information indicative of one or more costs associated with the selected operational service, or a second data structure comprising information indicative of terms and conditions associated with the selected operational service.

* * * * *